United States Patent
Asai et al.

(10) Patent No.: US 10,284,832 B2
(45) Date of Patent: May 7, 2019

(54) IMAGE PROCESSING APPARATUS, IMAGE PROCESSING METHOD, AND PROGRAM

(71) Applicant: SONY CORPORATION, Tokyo (JP)

(72) Inventors: Satoshi Asai, Saitama (JP); Hiroshi Nakayama, Tokyo (JP); Hiromi Iizuka, Kanagawa (JP); Takumi Suzuki, Kanagawa (JP); Tomoya Narita, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/743,484

(22) PCT Filed: Jul. 14, 2016

(86) PCT No.: PCT/JP2016/070875
§ 371 (c)(1),
(2) Date: Jan. 10, 2018

(87) PCT Pub. No.: WO2017/056642
PCT Pub. Date: Apr. 6, 2017

(65) Prior Publication Data
US 2018/0205918 A1  Jul. 19, 2018

(30) Foreign Application Priority Data
Sep. 30, 2015 (JP) .................. 2015-193917

(51) Int. Cl.
*H04N 9/31* (2006.01)
*G09G 5/00* (2006.01)
(Continued)

(52) U.S. Cl.
CPC ............ *H04N 9/3185* (2013.01); *G06T 7/50* (2017.01); *G06T 7/70* (2017.01); *G09G 5/00* (2013.01); *H04N 5/74* (2013.01)

(58) Field of Classification Search
CPC .... G03B 21/001; G03B 21/006; G03B 21/06; G03B 21/28; G03B 21/2013;
(Continued)

(56) References Cited

U.S. PATENT DOCUMENTS 5,940,204 A * 8/1999 Hewlett ............... F21S 10/007
348/E5.142
2008/0259354 A1* 10/2008 Gharib ............... G01B 11/2509
356/601
(Continued)

FOREIGN PATENT DOCUMENTS

JP  11-038949 A   2/1999
JP  2008-176042 A  7/2008
JP  2013-033206 A  2/2013

OTHER PUBLICATIONS

Naito et al., A Multi Degree-of-freedom Motion Device Interface for Media Installation, IEICE Technical Report, Nov. 2009, pp. 29-30.

*Primary Examiner* — Sultan Chowdhury
(74) *Attorney, Agent, or Firm* — Paratus Law Group, PLLC

(57) ABSTRACT

There is provided an image processing apparatus, an image processing method, and a program which can cause an image adapted to an object located between an operation unit and a drawing destination (30) to be drawn on the drawing destination, the image processing apparatus including: an image generating unit configured to generate a drawn image to be drawn on a drawing destination on a basis of a position of an operation unit. The image generating unit generates the drawn image on a basis of detected information of a stencil target (40) located between the operation unit and the drawing destination.

20 Claims, 18 Drawing Sheets

(51) Int. Cl.
*H04N 5/74* (2006.01)
*G06T 7/50* (2017.01)
*G06T 7/70* (2017.01)

(58) Field of Classification Search
CPC ....... G03B 21/2033; G06T 7/50; G06T 7/507;
G06T 7/536; G06T 7/543; H04N 9/3105;
H04N 9/3152; H04N 9/3185; H04N
9/3194
See application file for complete search history.

(56) References Cited

U.S. PATENT DOCUMENTS

2008/0273176 A1* 11/2008 Lloyd ................... G03B 21/06
353/50
2010/0092079 A1* 4/2010 Aller .................... G06K 9/3216
382/165

* cited by examiner

IMAGE PROCESSING APPARATUS, IMAGE PROCESSING METHOD, AND PROGRAM

CROSS REFERENCE TO PRIOR APPLICATION

This application is a National Stage Patent Application of PCT International Patent Application No. PCT/JP2016/070875 (filed on Jul. 14, 2016) under 35 U.S.C. § 371, which claims priority to Japanese Patent Application No. 2015-193917 (filed on Sep. 30, 2015), which are all hereby incorporated by reference in their entirety.

TECHNICAL FIELD

The present disclosure relates to an image processing apparatus, an image processing method, and a program.

BACKGROUND ART

In related art, various techniques of projecting an image onto a drawing destination such as a screen, for example, using a projector have been developed.

For example, Patent Literature 1 discloses a technique of causing a projector located on a back side of a projection plane to project onto the projection plane, an image in accordance with a detection result of motion of a user located on a front side of the translucent projection plane.

CITATION LIST

Patent Literature

Patent Literature 1: JP H 11-38949A

DISCLOSURE OF INVENTION

Technical Problem

However, the technique disclosed in Patent Literature 1 does not assume that an object is disposed between a projection plane and a projector. Therefore, with the technique disclosed in Patent Literature 1, for example, an image to be drawn on the projection plane cannot be changed in accordance with the object located between the projection plane and the projector.

Therefore, the present disclosure proposes new and improved image processing apparatus, image processing method and program which can cause an image adapted to an object located between an operation unit and a drawing destination to be drawn on the drawing destination.

Solution to Problem

According to the present disclosure, there is provided an image processing apparatus including: an image generating unit configured to generate a drawn image to be drawn on a drawing destination on a basis of a position of an operation unit.

The image generating unit generates the drawn image on a basis of detected information of a stencil target located between the operation unit and the drawing destination.

In addition, according to the present disclosure, there is provided an image processing method including: generating, by a processor, a drawn image to be drawn on a drawing destination on a basis of a position of an operation unit and detected information of a stencil target located between the operation unit and the drawing destination.

In addition, according to the present disclosure, there is provided a program causing a computer to function as: an image generating unit configured to generate a drawn image to be drawn on a drawing destination on a basis of a position of an operation unit. The image generating unit generates the drawn image on a basis of detected information of a stencil target located between the operation unit and the drawing destination.

Advantageous Effects of Invention

As described above, according to the present disclosure, it is possible to cause an image adapted to an object located between an operation unit and a drawing destination to be drawn on the drawing destination. Note that effects described here are not necessarily limitative and may be any effect described in the present disclosure.

MODE(S) FOR CARRYING OUT THE INVENTION

Figure 1:
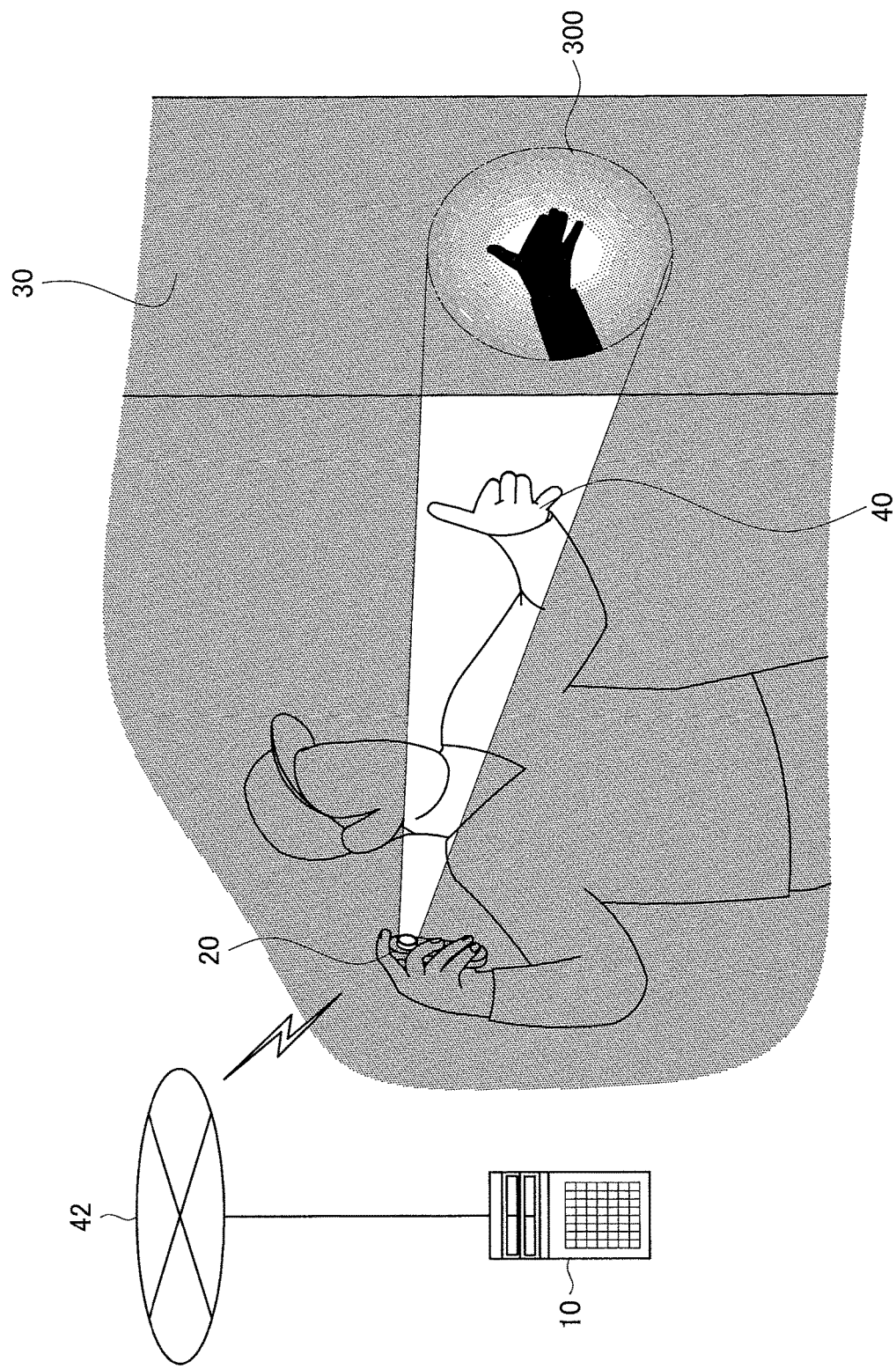
FIG. 1 is an explanatory diagram illustrating a configuration example of an image processing system according to an embodiment of the present disclosure.

Hereinafter, a preferred embodiment of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, there is also a case where, in the present specification and drawings, a plurality of components having substantially the same functional configuration are distinguished by different alphabetical characters being provided after the same reference numeral. For example, a plurality of configurations having substantially the same functional configuration are distinguished as a projection apparatus 20a and a projection apparatus 20b as necessary. However, in the case where it is not necessary to particularly distinguish each of a plurality of components having substantially the same functional configuration, only the same reference numeral is provided. For example, in the case where it is not necessary to particularly distinguish between the projection apparatus 20a and the projection apparatus 20b, they are simply referred to as a projection apparatus 20.

Further, the "Mode(s) for Carrying Out the Invention" will be described in accordance with order of sections described below.
1. Basic configuration of image processing system
2. Detailed description of embodiment
3. Hardware configuration
4. Modified examples

1. Basic Configuration of Image Processing System

First, a basic configuration of an image processing system according to the present embodiment will be described with reference to FIG. 1. As illustrated in FIG. 1, the image processing system according to the present embodiment includes a server 10, a projection apparatus 20, a drawing destination 30, a stencil target 40 and a communication network 42.

1-1. Server 10

The server 10 is an example of the image processing apparatus in the present disclosure. The server 10 is, for example, an apparatus for controlling projection of the projection apparatus 20. For example, the server 10 generates a drawn image on the basis of a detection result of positional relationship among the projection apparatus 20, the drawing destination 30 and the stencil target 40 and, then, causes the projection apparatus 20 to project the generated drawn image onto the drawing destination 30. As an example, the server 10 repeats a series of process of receiving a detection result relating to the drawing destination 30 or the stencil target 40 from the projection apparatus 20, generating a drawn image on the basis of the received detection result, and, then, controlling projection of the generated drawn image, in real time.

Note that the server 10 can transmit/receive information to/from the projection apparatus 20 via the communication network 42 which will be described later.

1-2. Projection Apparatus 20

The projection apparatus 20 is an apparatus which projects an image through light emission. For example, the projection apparatus 20 is a pico projector. Further, the projection apparatus 20 may be a gyroscope, a depth sensor, or the like.

Further, the projection apparatus 20 is, for example, a portable apparatus. For example, by a user holding the projection apparatus 20 with one hand and directing the projection apparatus 20 toward a desired position on the drawing destination 30, it is possible to project an image at a corresponding position. However, the projection apparatus 20 is not limited to such an example, and may be used by being provided on a table or a board or by being fixed on a floor, a ceiling, or the like.

Further, while details will be described later, the projection apparatus 20 can include a configuration for electronically implementing drawing using instrument such as, for example, a spray can, an double action air brush and a single action air brush. As an example, in the case where the projection apparatus 20 is configured to electronically implement drawing using a spray can, for example, the server 10 causes the projection apparatus 20 to project display of ejection of virtual ink and display of white light like spot light only while a predetermined button included in the projection apparatus 20 is being depressed.

Further, in the case where the projection apparatus 20 is configured to electronically implement drawing using a double action air brush, for example, if a predetermined button of the projection apparatus 20 is depressed as first action, the server 10 causes the projection apparatus 20 to project the above-described display of white light. Then, if a predetermined lever of the projection apparatus 20 is manipulated as second action, the server 10 causes the projection apparatus 20 to project display of ejection of virtual ink. Note that, at this time, a flow rate of the ink to be ejected may be changed in accordance with a degree of manipulation of the lever.

Further, in the case where the projection apparatus 20 is configured to electronically implement drawing using a single action air brush, for example, the server 10 causes the projection apparatus 20 to project display of ejection of virtual ink and the above-described display of white light only while the user is manipulating an operation unit such as, for example, a button and a lever of the projection apparatus 20. Note that, at this time, a flow rate of the ink to be ejected is changed in accordance with strength of manipulation with respect to the operation unit or a degree of manipulation.

Note that, the projection apparatus 20 may be able to electronically implement only one of the above-described instrument or may be able to electronically implement the above-described two or more types of instrument. For example, in the latter case, operation modes corresponding to respective types of instrument such as a spray can mode, a double action air brush mode and a single action air brush mode may be implemented at the projection apparatus 20.

Figure 2:
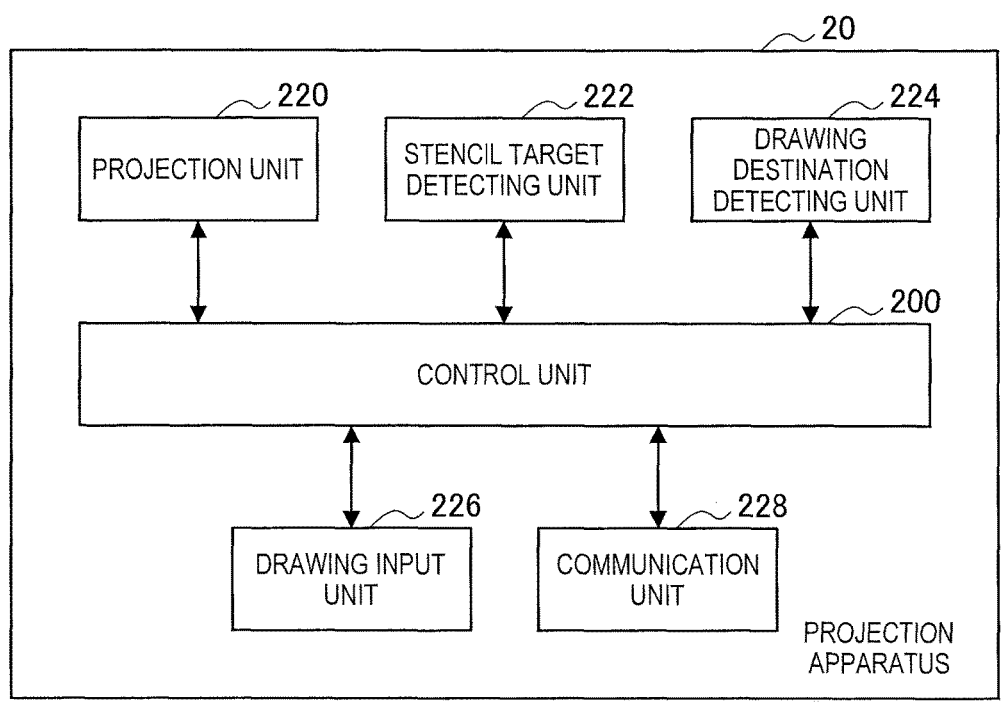
FIG. 2 is a functional block diagram illustrating a configuration example of a projection apparatus 20 according to an embodiment of the present disclosure.

Here, an example of an internal configuration of the projection apparatus 20 will be described with reference to FIG. 2. As illustrated in FIG. 2, the projection apparatus 20 includes, for example, a control unit 200, a projection unit 220, a stencil target detecting unit 222, a drawing destination detecting unit 224, a drawing input unit 226 and a communication unit 228.

1-2-1. Control Unit 200

The control unit 200 generally controls operation of the projection apparatus 20 using hardware such as, for example a central processing unit (CPU) and a random access memory (RAM) incorporated into the projection apparatus 20.

1-2-2. Projection Unit 220

The projection unit 220 projects an image through light emission in accordance with control by the control unit 200. For example, the projection unit 220 projects an image onto the drawing destination 30 through projection mapping in accordance with control by the control unit 200.

1-2-3. Stencil Target Detecting Unit 222

The stencil target detecting unit 222 can detect a stencil target 40 which is an object located between the projection apparatus 20 and the drawing destination 30. For example, the stencil target detecting unit 222 detects shape of the stencil target 40 through time of flight (ToF). Alternatively, the stencil target detecting unit 222 detects shape of the stencil target 40 by acquiring a depth image on the basis of images photographed by a plurality of cameras (not illustrated). Note that these plurality of cameras may be provided at the projection apparatus 20 or may be provided outside the projection apparatus 20 and may be able to communicate with the projection apparatus 20.

Alternatively, the stencil target detecting unit 222 detects shape of the stencil target 40 by acquiring a luminance difference image on the basis of calculation of a difference between frames. Alternatively, the stencil target detecting unit 222 detects shape of the stencil target 40 on the basis of a photographed image which is obtained by photographing actual shadow of the stencil target 40 projected onto the drawing destination 30 with a camera.

1-2-3-1. Modified Example

Note that, as a modified example, in the case where a predetermined marker such as, for example, a two-dimensional barcode and an invisible marker is put on the stencil target 40, the stencil target detecting unit 222 may detect the predetermined marker put on the stencil target 40 instead of detecting shape of the stencil target 40. Further, the stencil target detecting unit 222 can acquire information of the shape corresponding to the stencil target 40 by reading out predetermined information such as, for example, an ID of the stencil target 40 from the detected predetermined marker and, for example, referring to a database (not illustrated) on the basis of the read-out information. Note that, in a case of this modified example, the shape of the stencil target 40 itself may be different from shape indicated by the information acquired from the database. Further, the stencil target detecting unit 222 may acquire attribute information of the stencil target 40 from a database server in place of or in addition to acquiring the information of the shape corresponding to the stencil target 40.

1-2-3-2. Stencil Image

Figure 3:
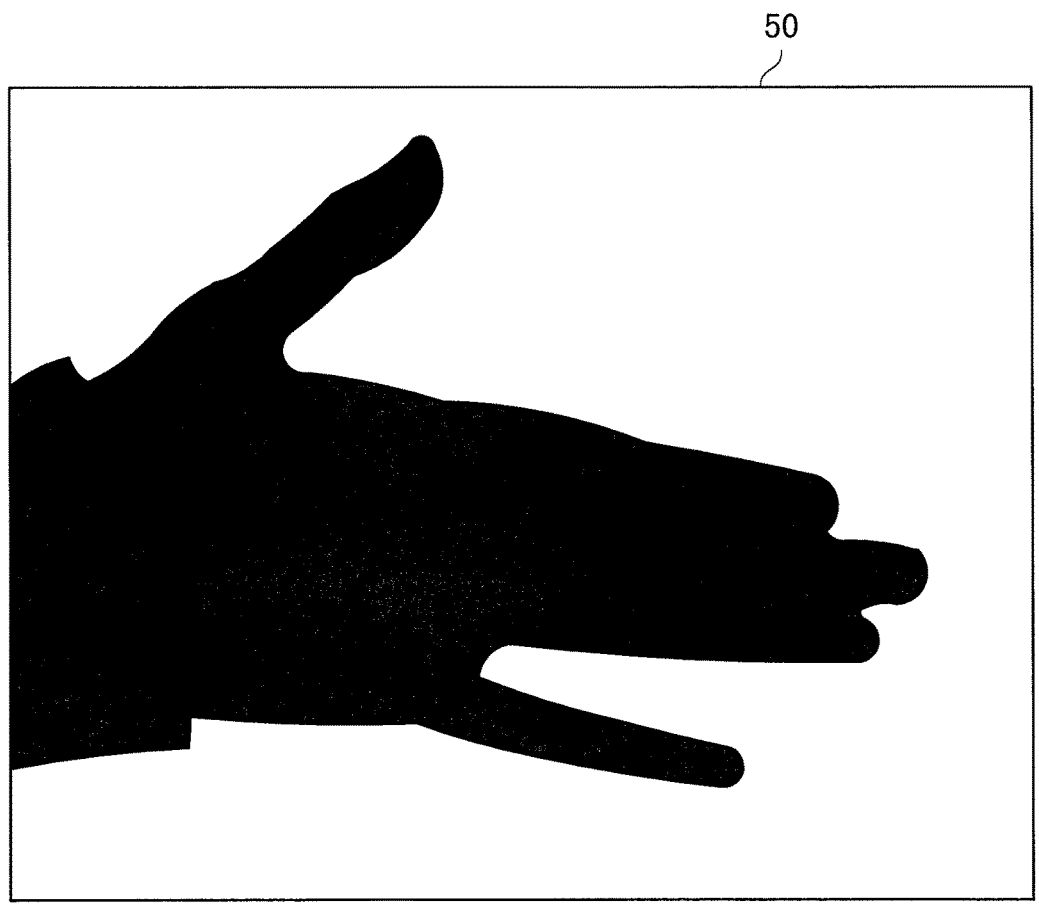
FIG. 3 is an explanatory diagram illustrating a configuration example of a stencil image according to an embodiment of the present disclosure.

Further, the stencil target detecting unit 222 can generate a stencil image on the basis of the detected shape of the stencil target 40. FIG. 3 is an explanatory diagram illustrating an example of the generated stencil image (stencil image 50). Note that FIG. 3 illustrates a configuration example of the stencil image 50 generated when one hand of the user is detected as the stencil target 40 as illustrated in FIG. 1. As illustrated in FIG. 3, the stencil image 50 is binary image data indicating the detected shape of the stencil target 40.

1-2-4. Drawing Destination Detecting Unit 224

The drawing destination detecting unit 224 can detect the drawing destination 30. For example, the drawing destination detecting unit 224 detects attribute of the drawing destination 30. As an example, the drawing destination detecting unit 224 detects a position of the drawing destination 30, for example, attitude such as a direction the drawing destination 30 faces, shape, surface roughness, or the like.

Further, the drawing destination detecting unit 224 detects positional relationship (for example, a distance and a relative direction) between the projection apparatus 20 and the drawing destination 30. As an example, for example, in the case where a predetermined marker such as a two-dimensional barcode and an invisible marker is put on the drawing destination 30, the drawing destination detecting unit 224 detects positional relationship between the projection apparatus 20 and the drawing destination 30 on the basis of a photographing result of the predetermined marker by a camera. Alternatively, the drawing destination detecting unit 224 detects positional relationship between the projection apparatus 20 and the drawing destination 30 using an infrared beacon. Alternatively, the drawing destination detecting unit 224 detects positional relationship between the projection apparatus 20 and the drawing destination 30 through combination of ToF and plane recognition. Alternatively, the drawing destination detecting unit 224 detects positional relationship between the projection apparatus 20 and the drawing destination 30 by recognizing a Voronoi pattern of infrared light radiated on the drawing destination 30.

Further, the drawing destination detecting unit 224 can also detect a region where the projection apparatus 20 projects an image onto the drawing destination 30, a position pointed by the projection apparatus 20, or the like.

1-2-4-1. Modified Example

Note that, as a modified example, the drawing destination detecting unit 224 may be further able to identify an ID of the drawing destination 30. For example, in the case where a predetermined marker in which the ID of the drawing destination 30 is stored is put on the drawing destination 30, the drawing destination detecting unit 224 may detect the predetermined marker and read out the ID of the drawing destination 30 from the detected marker. Alternatively, in the case where the ID itself of the drawing destination 30 is described on the drawing destination 30, the drawing destination detecting unit 224 may identify the ID of the drawing destination 30 on the basis of, for example, a photographing result by a camera.

In a case of this modified example, the drawing destination detecting unit 224 can also acquire attribute information of the drawing destination 30 by further referring to, for example, a database on the basis of the identified ID.

1-2-5. Drawing Input Unit 226

The drawing input unit 226 is an example of the operation unit in the present disclosure. The drawing input unit 226 accepts drawing manipulation by the user with respect to the drawing destination 30. For example, the drawing input unit 226 accepts manipulation of inputting start and termination of drawing, manipulation of designating a pointing position on the drawing destination 30, manipulation of switching a drawing mode, or the like. This drawing input unit 226 includes, for example, a button, a switch, a lever, or the like.

For example, the drawing input unit 226 may have an operation unit similar to the operation unit included in a spray can, a double action air brush or a single action air brush. By this means, the user can manipulate the drawing input unit 226 using a manipulation method similar to that for actual spray can and air brush.

1-2-6. Communication Unit 228

The communication unit 228 communicates with other apparatuses via, for example, a communication network 42. For example, the communication unit 228 transmits detected information by the stencil target detecting unit 222, detected information by the drawing destination detecting unit 224 and input information with respect to the drawing input unit 226 to the server 10 in accordance with control by the control unit 200. Further, the communication unit 228 receives a drawn image from the server 10.

1-3. Drawing Destination 30

The drawing destination 30 is an object onto which the projection apparatus 20 is to perform projection. For example, the drawing destination 30 is plane included in a wall, a screen, a floor, a ceiling, or the like. However, the drawing destination 30 is not limited to such examples and may be a solid or may be a fluid such as water.

1-4. Stencil Target 40

The stencil target 40 is an object located in space between the projection apparatus 20 and the drawing destination 30. For example, FIG. 1 illustrates an example where the stencil target 40 is the hand of the user disposed between the projection apparatus 20 and the drawing destination 30. Note that, while details will be described later, according to the present embodiment, as illustrated in FIG. 1, for example, display indicating shadow of the stencil target 40 is projected onto the drawing destination 30 by the projection apparatus 20.

1-5. Communication Network 42

The communication network 42 is a wired or wireless transmission path for information to be transmitted from an apparatus connected to the communication network 42. For example, the communication network 42 may include a public switched telephone network such as a telephone network, the Internet and a satellite communication network, various kinds of local area networks (LANs) including Ethernet (registered trademark), a wide area network (WAN), or the like. Further, the communication network 42 may include a leased line network such as Internet protocol-virtual private network (IP-VPN).

The configuration of the image processing system according to the present embodiment has been described above. The server 10 according to the present embodiment can generate a drawn image adapted to positional relationship among the projection apparatus 20, the drawing destination 30 and the stencil target 40 and can cause the projection apparatus 20 to project the generated drawn image onto the drawing destination 30.

2. Detailed Description of Embodiment

2-1. Configuration

Figure 4:
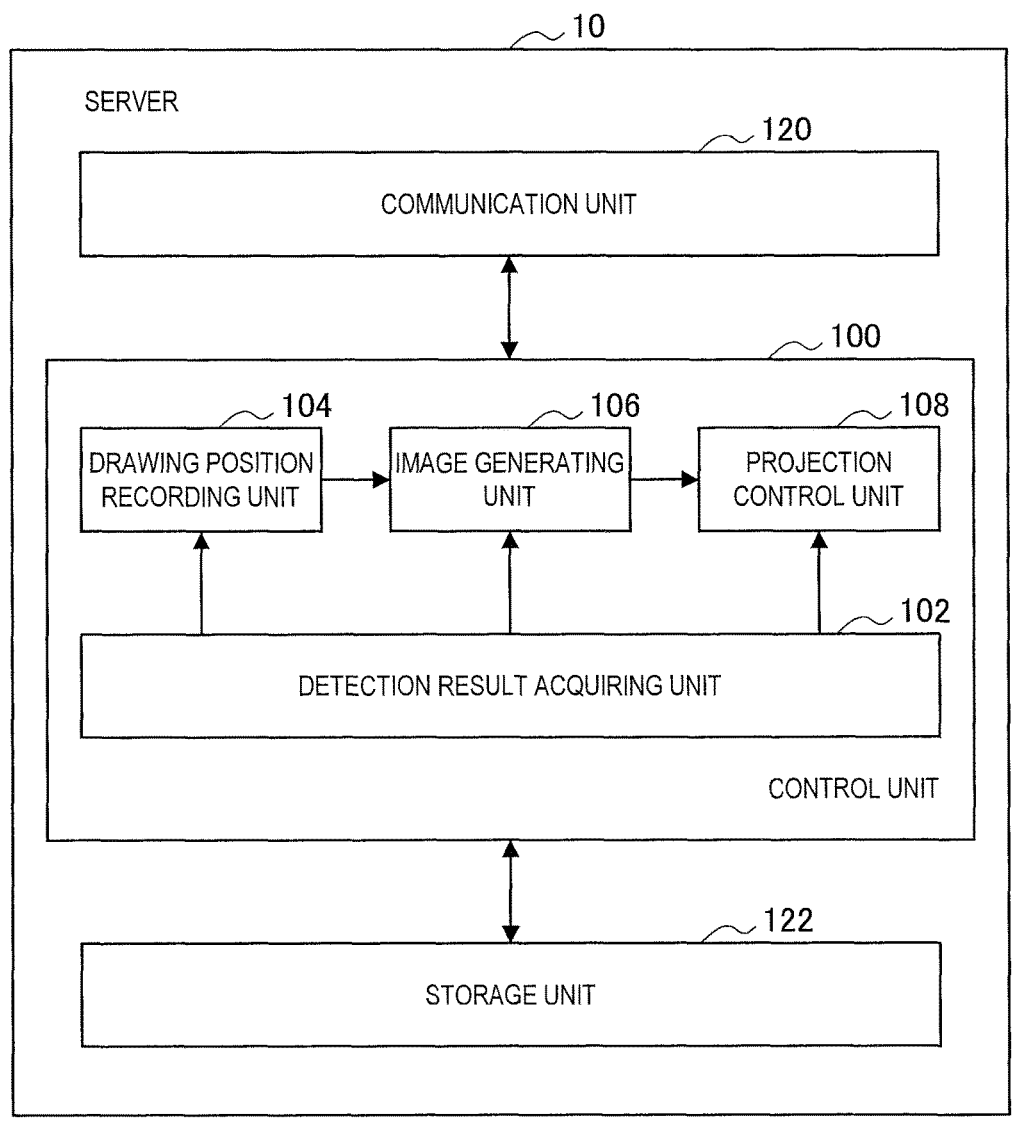
FIG. 4 is a functional block diagram illustrating a configuration example of a server 10 according to an embodiment of the present disclosure.

A configuration of the server 10 according to the present embodiment will be described in detail next. FIG. 4 is a functional block diagram illustrating the configuration of the server 10 according to the present embodiment. As illustrated in FIG. 4, the server 10 includes a control unit 100, a communication unit 120 and a storage unit 122.

2-1-1. Control Unit 100

The control unit 100 generally controls operation of the server 10 using hardware such as a CPU 150 and a RAM 154 which will be described later, incorporated into the server 10. Further, as illustrated in FIG. 4, the control unit 100 includes a detection result acquiring unit 102, a drawing position recording unit 104, an image generating unit 106 and a projection control unit 108.

2-1-2. Detection Result Acquiring Unit 102

The detection result acquiring unit 102 acquires a detection result relating to the projection apparatus 20, the drawing destination 30 and the stencil target 40 on the basis of, for example, the information received from the projection apparatus 20. For example, the detection result acquiring unit 102 acquires a detection result of positional relationship among the projection apparatus 20, the drawing destination 30 and the stencil target 40.

Further, the detection result acquiring unit 102 acquires a detection result such as, for example, a position, attitude, twist, moving speed, a moving direction, a pointing position on the drawing destination 30 and contents of drawing manipulation by the user relating to the projection apparatus 20 and information input to the projection apparatus 20 by the user. Further, the detection result acquiring unit 102 acquires a detection result such as, for example, a position, attitude, shape, surface roughness and color relating to the drawing destination 30. Still further, the detection result acquiring unit 102 acquires a detection result such as, for example, a position, attitude and shape relating to the stencil target 40.

2-1-3. Drawing Position Recording Unit 104

The drawing position recording unit 104 records a detection result of the pointing position on the drawing destination 30 by the projection apparatus 20 in the storage unit 122 as a drawing position by the user on the basis of, for example, the detection result detected by the detection result acquiring unit 102. For example, the drawing position recording unit 104 records trajectory of the pointing position detected during predetermined drawing manipulation using the projection apparatus 20 in the storage unit 122 as trajectory of the drawing position by the user. As an example, the drawing position recording unit 104 records contents of the drawing manipulation by the user and information of the drawing position onto the drawing destination 30 in the storage unit 122 in association with each other.

2-1-4. Image Generating Unit 106

2-1-4-1. Generation Example 1

The image generating unit 106 generates a drawn image on the basis of the detection result acquired by the detection result acquiring unit 102 and the drawing position stored in the storage unit 122. For example, the image generating unit 106 generates a drawn image so as to include display indicating a plurality of drawing positions stored in the storage unit 122. Here, the display indicating the drawing positions is, for example, display indicating a virtual object ejected toward the drawing position from the projection apparatus 20. Further, the virtual object is, for example, misty ink ejected from a spray or an air brush. However, without being limited to such an example, the display indicating the drawing positions may be a predetermined image, and the virtual object may be a predetermined object other than ink. Note that, in the following description, an example where the virtual object is misty ink will be mainly described.

Note that ejection shape and an ejection size of ink (ejected from the projection apparatus 20) may be determined in accordance with the information relating to the projection apparatus 20. For example, the ejection shape of the ink can be determined to be conical shape, shape of an elliptical cone, or the like, in accordance with setting information of the projection apparatus 20 or a type of the projection apparatus 20. Further, the ejection size may be changed in accordance with, for example, a detection result of a distance between the projection apparatus 20 and the drawing destination 30 or may be a predetermined size. For example, in the former case, the ejection size may be made larger as a detection value of the distance between the projection apparatus 20 and the drawing destination 30 is greater.

Further, the image generating unit 106 generates a drawn image so as to include display indicating a projection range by the projection apparatus 20 on the drawing destination 30. Here, the display indicating the projection range is, for example, display indicating a projection range of white light emitted from the projection apparatus 20 toward the drawing destination 30 like spot light (hereinafter, referred to as white light display). This white light display is, for example, a circle or an ellipse. Further, the white light display is, for example, effect of reducing luminance as a distance from the pointing position by the projection apparatus 20 becomes longer.

Display of Ink

Figure 5:
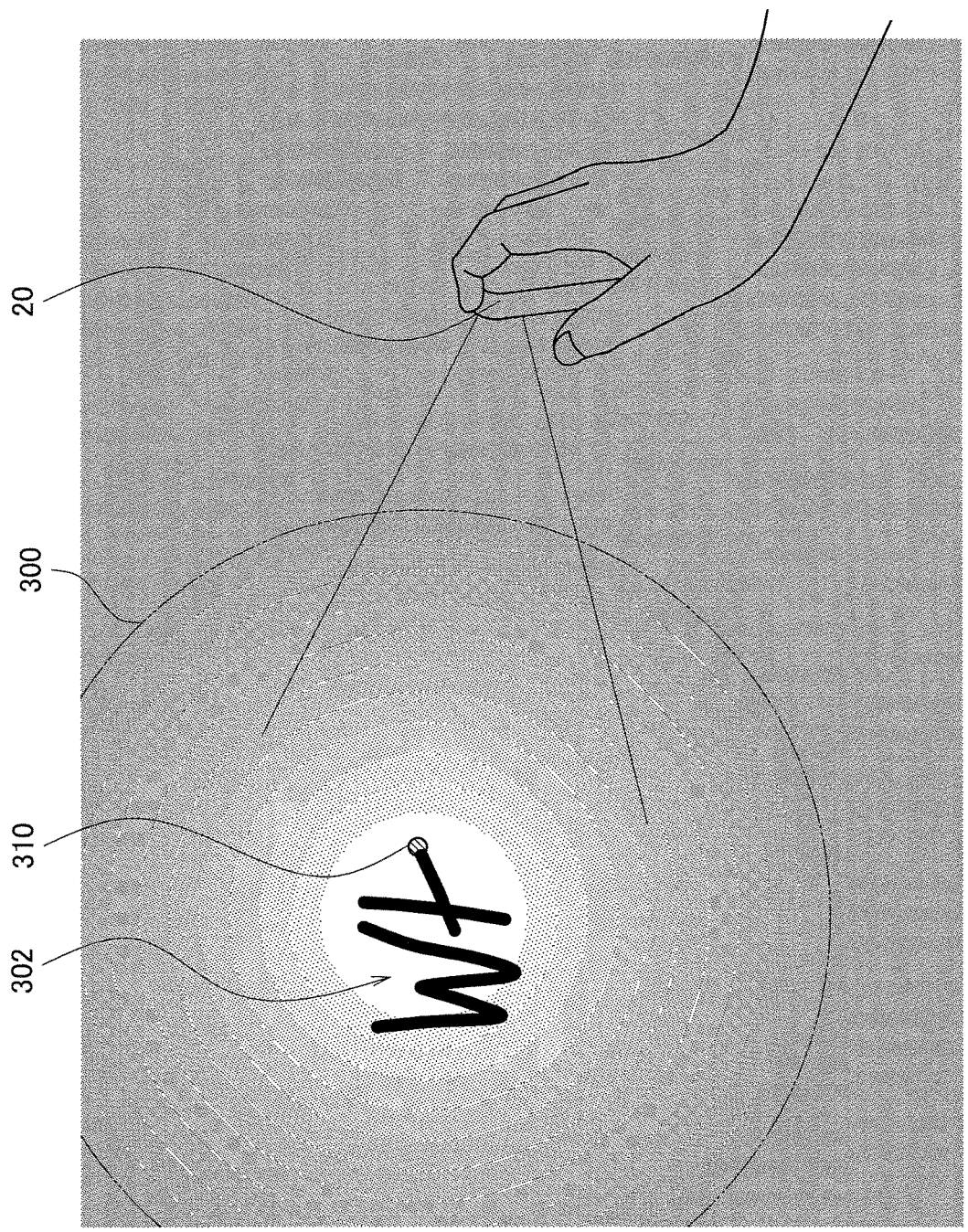
FIG. 5 is an explanatory diagram illustrating an example where a drawn image generated by the server 10 is projected onto a drawing destination 30.

Here, the above-described functions will be described in more detail with reference to FIG. 5 and FIG. 6. FIG. 5 is an explanatory diagram illustrating an example where the drawn image generated by the image generating unit 106 is projected onto the drawing destination 30. As illustrated in FIG. 5, the image generating unit 106 disposes display 302 indicating ink virtually ejected to a plurality of drawing positions within the drawn image for the plurality of drawing positions stored in the storage unit 122 on the basis of the detection result of the positional relationship between the projection apparatus 20 and the drawing destination 30. For example, the image generating unit 106 disposes the display 302 of ink ejected to the plurality of drawing positions within the drawn image only for a plurality of drawing positions located within a display range of the white light display 300 among the plurality of drawing positions stored in the storage unit 122.

Note that the image generating unit 106 may change a flow rate of ink relating to the display 302 of the ejected ink on the basis of the detection result acquired by the detection result acquiring unit 102. For example, in a state where the pointing position is the same, the image generating unit 106 determines the display 302 of the ink ejected at the pointing position so that the flow rate of the ejected ink becomes larger as a duration of predetermined manipulation for ejecting ink is longer. Further, for example, in the case where a mode of the projection apparatus 20 is set at a double action air brush mode or a single action air brush mode, and, for example, manipulation of pulling a lever included in the projection apparatus 20 is detected, the image generating unit 106 determines the display 302 of the ink ejected at the pointing position so that the flow rate of the ink becomes larger as a degree of the manipulation of pulling the lever is larger.

Note that, as a modified example, in the case where a duration of predetermined manipulation for ejecting ink reaches equal to or longer than a predetermined time period, the image generating unit 106 may determine the display 302 of the ejected ink so that the flow rate of the ejected ink is reduced. Further, in the case where, thereafter, for example, manipulation of shaking the projection apparatus 20 is detected, the image generating unit 106 may return the flow rate of the ejected ink to an initial state. According to this control example, it is possible to realize a phenomenon similar to that in the case where the remaining amount of ink in an actual spray can is reduced, so that the user can perform drawing as if the user used an actual spray can.

Display of White Light

Further, as illustrated in FIG. 5, the image generating unit 106 disposes the white light display 300 within the drawn image using, for example, a current pointing position as a reference. Note that the image generating unit 106 may change a display aspect of the display 310 indicating the pointing position on the basis of, for example, display color set for the display 302 of the ejected ink, shape of the projection apparatus 20, a detection result of a distance between the projection apparatus 20 and the drawing destination 30 or a setting parameter of the flow rate of the ejected ink. According to this control example, if the user performs manipulation for ejecting ink, it is possible to preview how the display 302 of ink is displayed. Therefore, the user can draw the display 302 of ink as the user intended.

Figure 6:
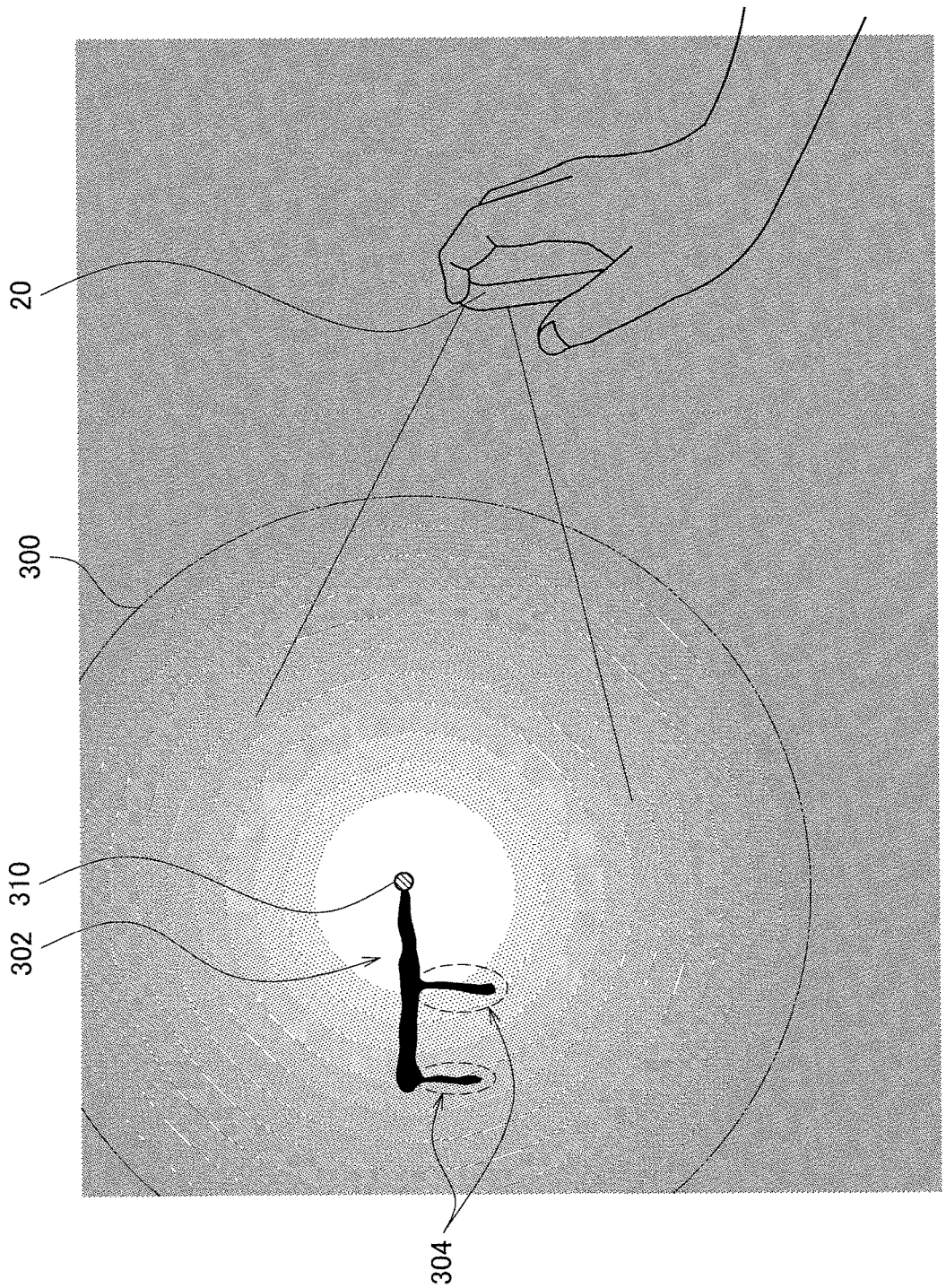
FIG. 6 is an explanatory diagram illustrating an example where a drawn image generated by the server 10 is projected onto a drawing destination 30.

Further, FIG. 6 is an explanatory diagram illustrating another example of the generated drawn image generated by the image generating unit 106 and an example where the drawn image is projected onto the drawing destination 30. As illustrated in FIG. 6, the image generating unit 106 can further dispose display 304 of dripping of ink within the drawn image for the display 302 of the ejected ink on the basis of the detection result acquired by the detection result acquiring unit 102.

For example, the image generating unit 106 disposes the display 304 of dripping of the ink at a pointing position upon start of the predetermined manipulation for ejecting ink or at a pointing position upon termination. Alternatively, the image generating unit 106 may dispose the display 304 of dripping of ink at the pointing position only in the case where an integrated value of the flow rate of the ink ejected at one pointing position is equal to or greater than a predetermined value such as, for example, in the case where predetermined manipulation for ejecting ink continues for equal to or longer than a predetermined time period. Further, the image generating unit 106 may determine the display 304 of dripping of ink so that an amount of dripping ink increases as a duration of the predetermined manipulation for ejecting ink is longer.

Further, the image generating unit 106 may determine the display 304 of dripping of ink so that a more amount of ink drips as a surface of the detected drawing destination 30 is smoother. Still further, the image generating unit 106 may determine the display 304 of dripping of ink so that an amount of dripping ink changes in accordance with moving speed and a moving direction of the projection apparatus 20 upon the predetermined manipulation for ejecting ink. Further, the image generating unit 106 may determine the display 304 of dripping of ink so that an amount of dripping ink and how the ink flows change on the basis of the detection result of the surface roughness of the drawing destination 30.

According to these determination examples, it is possible to express a phenomenon of dripping of ink upon usage of an actual spray can or air brush in a pseudo manner. Therefore, the user can perform drawing as if the user used an actual spray can or air brush.

2-1-4-2. Generation Example 2

Further, in the case where the stencil target 40 is detected, the image generating unit 106 generates a drawn image so as to further include display of shape of the detected stencil target 40. Here, the display of the shape of the stencil target 40 may be, for example, display indicating shadow of the stencil target 40 on the drawing destination 30. Note that the display indicating the shadow of the stencil target 40 is, for example, display indicating (virtual) shadow projected onto the drawing destination 30 by light emitted from the projection apparatus 20 being blocked by the stencil target 40 if the stencil target 40 is located between the projection apparatus 20 and the drawing destination 30.

For example, the image generating unit 106 first calculates shape of shadow in the case where the shadow of the stencil target 40 is projected onto the drawing destination 30 on the basis of the detection result of the positional relationship between the projection apparatus 20 and the drawing destination 30 and the detection result of the shape of the stencil target 40. The image generating unit 106 then disposes display 320 of the shadow of the calculated shape within the drawn image.

Figure 7:
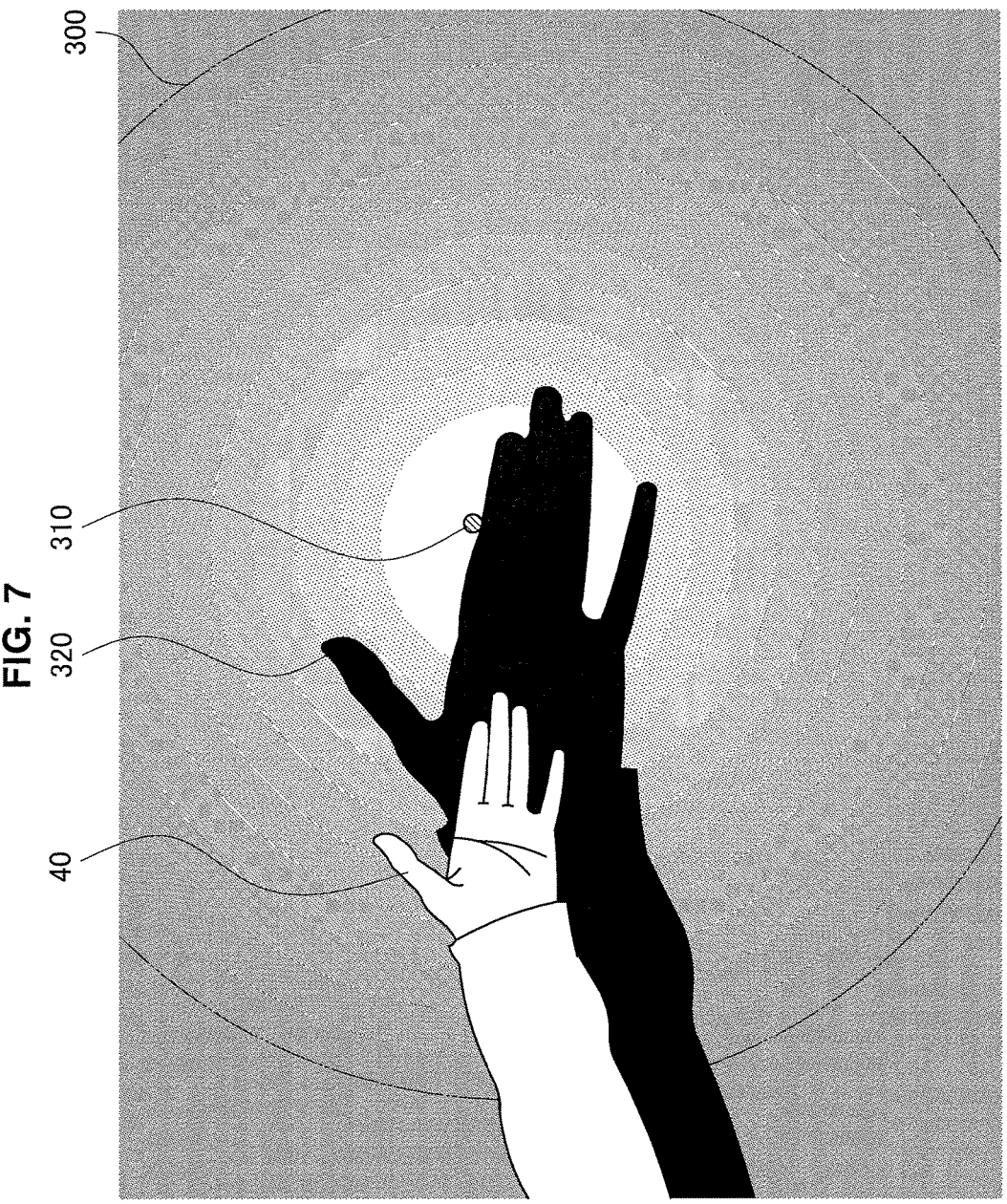
FIG. 7 is an explanatory diagram illustrating an example where a drawn image generated by the server 10 is projected onto a drawing destination 30.

FIG. 7 is an explanatory diagram illustrating an example of the generated drawn image including the display 320 indicating the shadow of the stencil target 40 and an example where the drawn image is projected onto the drawing destination 30. Note that FIG. 7 illustrates an example where the display 320 of the shadow of the stencil target 40 is disposed within the drawn image when one hand of the user is detected as the stencil target 40 as illustrated in FIG. 1.

Note that, as display color of the display 320 of the shadow of the stencil target 40, predetermined color such as, for example, black may be set or color designated by the user may be set. Further, in the case where, for example, manipulation for changing the display color is detected, the server 10 may be able to change the display color set once.

2-1-4-3. Guide Display

Further, while details will be described later, guide display for allowing the user to designate a position where the display of the shape of the stencil target 40 is to be disposed can be projected onto the drawing destination 30 by the projection apparatus 20. In this case, the image generating unit 106 can determine the position where the display of the shape of the stencil target 40 is to be disposed in the drawn image to be generated on the basis of detection of user manipulation for moving a projection position of the guide display.

2-1-4-4. Modified Example

Note that, typically, for example, in the case where the projection apparatus 20 is held with the hand of the user and the stencil target 40 is located near the user, if the stencil target 40 is illuminated with white light projected by the projection apparatus 20, the user can feel that reflected light of the white light projected onto the stencil target 40 is too bright. Therefore, as a modified example, the image generating unit 106 may generate a drawn image by hollowing out a region of the shape of the detected stencil target 40 or a region slightly smaller than the shape of the stencil target 40 from a display region of white light display. According to this modified example, even if the stencil target 40 is located near the user, because little white light is projected onto the stencil target 40, it is possible to avoid a situation where the user feels that reflected light at the stencil target 40 is too bright.

Further, as another modified example, the image generating unit 106 may be able to switch whether the above-described white light display is disposed within the drawn image in accordance with, for example, user setting. Note that, in the case where the white light display is not disposed within the drawn image, an object (such as, for example, display 302 of ink) included in a projection possible range of the projection apparatus 20 itself is visibly displayed on the drawing destination 30.

2-1-5. Projection Control Unit 108

2-1-5-1. Control Example 1

The projection control unit 108 performs control of projection on the projection apparatus 20. For example, as illustrated in FIG. 5 to FIG. 7, the projection control unit 108 causes the projection apparatus 20 to project the drawn image generated by the image generating unit 106 onto the drawing destination 30.

2-1-5-2. Control Example 2

Further, in the case where the shape of the stencil target 40 is detected, the projection control unit 108 causes the projection apparatus 20 to project the above-described guide display in a target region on the drawing destination 30. Note that the target region can be determined in accordance with, for example, a use case. For example, the target region may be a region of a predetermined position on the drawing destination 30 or may be a region based on the pointing position on the drawing destination 30. Alternatively, a target position may be a region where the shadow of the stencil target 40 on the drawing destination 30 is calculated, which is calculated in accordance with the detection result of the positional relationship among the projection apparatus 20, the drawing destination 30 and the stencil target 40.

Here, the above-described functions will be described in more detail with reference to FIG. 8. As illustrated in (A) in FIG. 8, the stencil target detecting unit 222 of the projection apparatus 20 detects shape of the stencil target 40 located between the projection apparatus 20 and the drawing destination 30. Note that FIG. 8 illustrates an example where the stencil target 40 is a star-shaped object.

Figure 8:
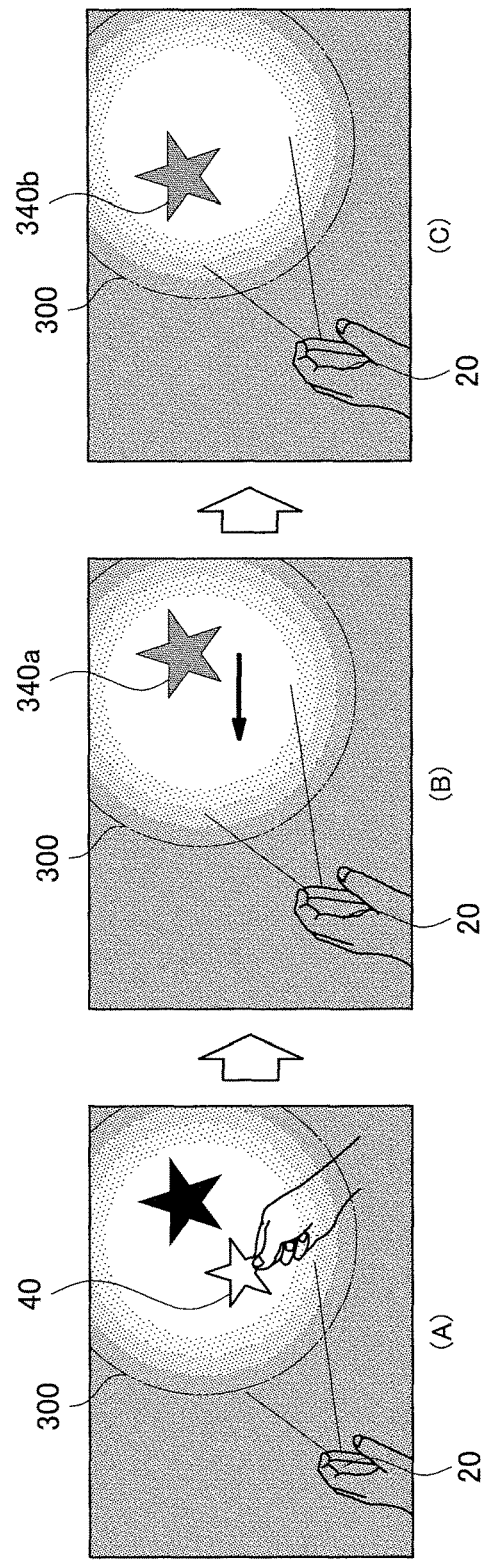
FIGS. 8(A), 8(B), and 8(C) are explanatory diagrams illustrating a projection example of guide display for designating a position where display of shape of a stencil target 40 is to be disposed according to an embodiment of the present disclosure.

Then, as illustrated in (B) in FIG. 8, the projection control unit 108 causes the projection apparatus 20 to project the guide display 340 indicating the detected shape of the stencil target 40, for example, at a predetermined position on the drawing destination 30. Then, the user moves the guide display 340 as indicated with an arrow illustrated in (B) in FIG. 8 by, for example, manipulating the projection apparatus 20.

The image generating unit 106 then generates a drawn image by determining a position of guide display 340b after movement as illustrated in (C) in FIG. 8 as a position where the display of the shape of the stencil target 40 is to be disposed in the drawn image to be generated. Subsequently, the projection control unit 108 causes the projection apparatus 20 to project the generated drawn image onto the drawing destination 30.

2-1-5-3. Modified Example

Note that, as a modified example, the projection control unit 108 may change an amount of light upon projection of the drawn image on the basis of the detection result of the distance between the projection apparatus 20 and the drawing destination 30. For example, in the case where the distance between the projection apparatus 20 and the drawing destination 30 becomes larger, the projection control unit 108 may increase the amount of light upon projection of the drawn image, while, in the case where the distance between the projection apparatus 20 and the drawing destination 30 becomes smaller, the projection control unit 108 may decrease the amount of light upon projection of the drawn image. According to this control example, the drawn image is projected with a fixed amount of light regardless of the distance between the projection apparatus 20 and the drawing destination 30. Therefore, even if the projection apparatus 20 is moved closer to the drawing destination 30, it is possible to avoid a situation where the user feels that reflected light of light projected onto the drawing destination 30 is too bright.

2-1-6. Communication Unit 120

The communication unit 120 transmits/receives information to/from other apparatuses which can communicate with the server 10. For example, the communication unit 120 transmits the drawn image generated by the image generating unit 106 to the projection apparatus 20 in accordance with control by the projection control unit 108. Further, the communication unit 120 receives, for example, information detected by the projection apparatus 20 and information input to the projection apparatus 20 from the projection apparatus 20.

2-1-7. Storage Unit 122

The storage unit 122 stores various kinds of data and various kinds of software. For example, the storage unit 122 stores date and time of detection of drawing manipulation with respect to the projection apparatus 20 by the user, contents of the drawing manipulation by the user and a drawing position on the drawing destination 30 in association with one another.

2-2. Application Example

The configuration according to the present embodiment has been described above. Here, application examples according to the present embodiment will be described in "2-2-1. Display of shadow of stencil target 40" to "2-2-7. Simultaneous duplication by a plurality of projection apparatuses 20". Note that, in the following description, various projection examples of display of the shape of the stencil target 40 will be described.

2-2-1. Display of Shadow of Stencil Target 40

Figure 9:
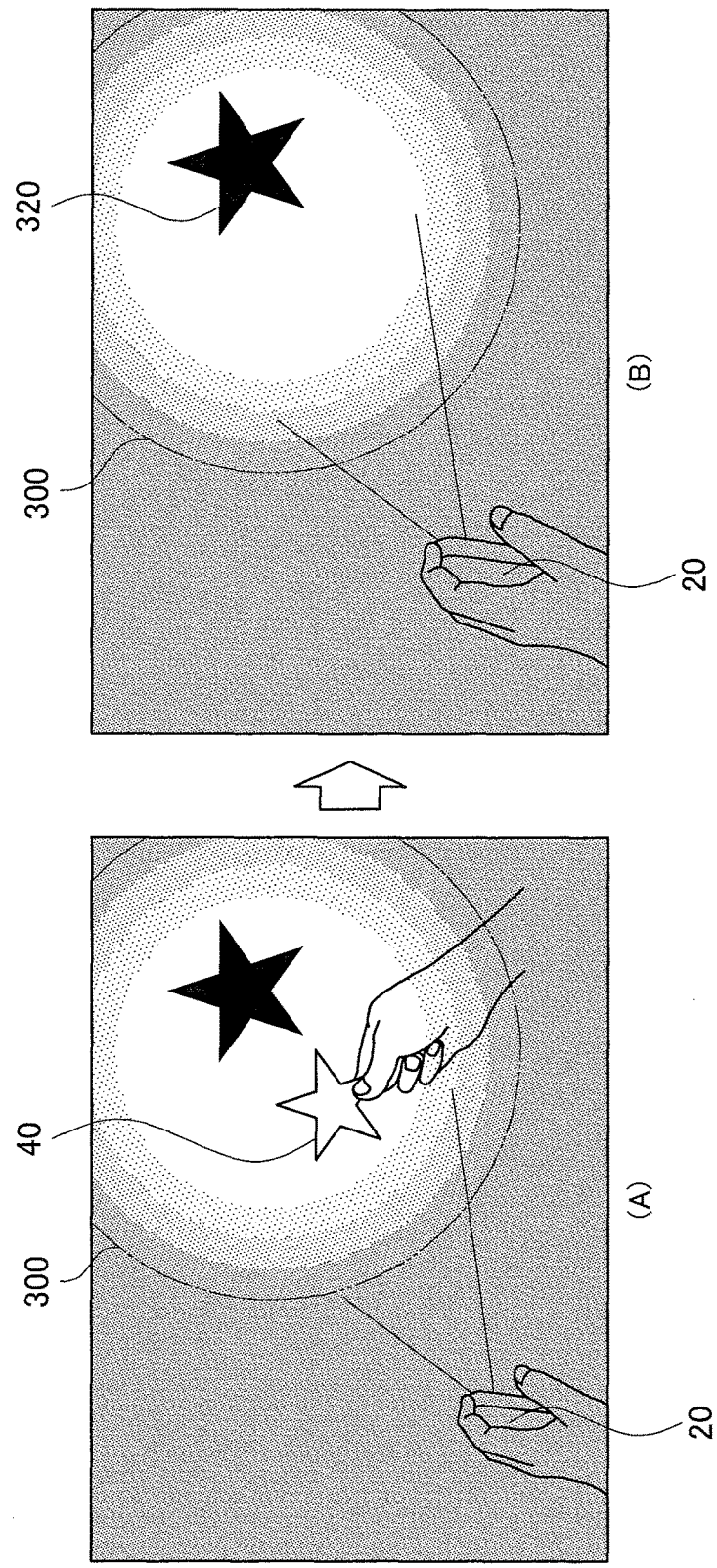
FIGS. 9(A) and 9(B) are explanatory diagrams illustrating a projection example of display of shadow of the stencil target 40 according to an embodiment of the present disclosure.

First, a projection example of the display 320 of the shadow of the stencil target 40 will be described with reference to FIG. 9. For example, as illustrated in (A) in FIG. 9, first, the stencil target detecting unit 222 of the projection apparatus 20 detects the shape of the stencil target 40. Then, the image generating unit 106 determines the white light display 300 on the basis of the detection result of the positional relationship between the projection apparatus 20 and the drawing destination 30. The image generating unit 106 then determines the display 320 of the shadow of the stencil target 40 on the basis of the detection result of the positional relationship among the projection apparatus 20, the drawing destination 30 and the stencil target 40 and the detection result of the shape of the stencil target 40. The image generating unit 106 then generates a drawn image including the determined white light display 300 and display 320 of shadow of the stencil target 40. Subsequently, as illustrated in (B) in FIG. 9, the projection control unit 108 causes the projection apparatus 20 to project the generated drawn image onto the drawing destination 30.

2-2-2. Punched Display of Shape of Stencil Target 40 in Projected Light

Figure 10:
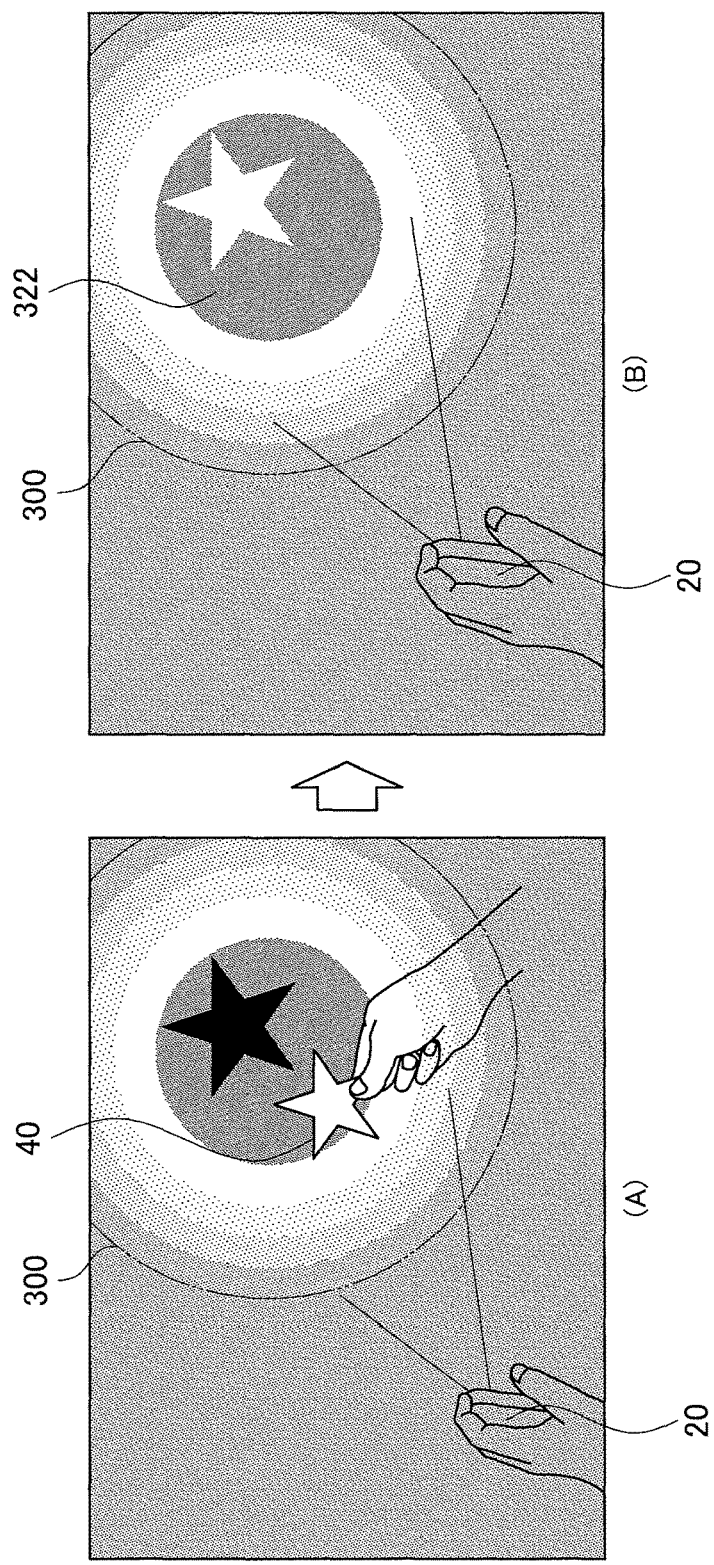
FIGS. 10(A) and 10(B) are explanatory diagrams illustrating a projection example of punched display of shape of the stencil target 40 in projected light according to an embodiment of the present disclosure.

Next, with reference to FIG. 10, a projection example of punched display 322 of the shape of the stencil target 40 in projected light will be described with reference to FIG. 10. As illustrated in (A) in FIG. 10, first, the projection apparatus 20 detects the shape of the stencil target 40 (in a similar manner to the example illustrated in (A) in FIG. 9). The image generating unit 106 then determines the while light display 300 on the basis of the detection result of the positional relationship between the projection apparatus 20 and the drawing destination 30. The image generating unit 106 then determines the punched display 322 like a hole made in the shape of the stencil target 40 in a region where light other than white light is radiated, emitted from the projection apparatus 20 to the drawing destination 30 as illustrated in, for example, (B) in FIG. 10 on the basis of the detection result of the positional relationship among the projection apparatus 20, the drawing destination 30 and the stencil target 40 and the detection result of the shape of the stencil target 40. The image generating unit 106 then generates a drawn image including the determined white light display 300 and the punched display 322 of the shape of the stencil target 40 in the projected light. Subsequently, the projection control unit 108 causes the projection apparatus 20 to project the generated drawn image onto the drawing destination 30.

2-2-3. Display of Shape of Stencil Having Transparency

Figure 11:
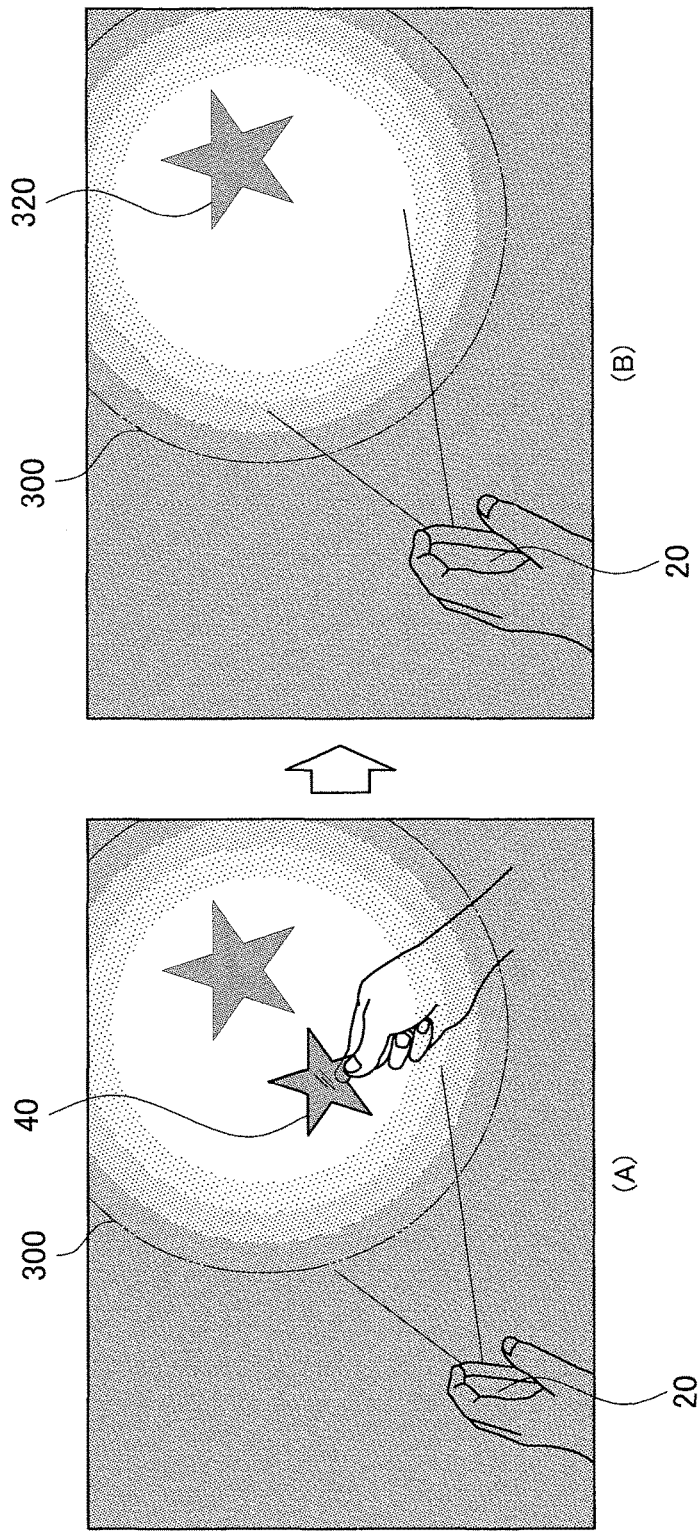
FIGS. 11(A) and 11(B) are explanatory diagrams illustrating a projection example of display of shadow of the stencil target 40 having transparency according to an embodiment of the present disclosure.

A projection example of the display 320 of the shape of the stencil target 40 having transparency will be described next with reference to FIG. 11. For example, as illustrated in (A) in FIG. 11, first, the stencil target detecting unit 222 of the projection apparatus 20 detects the shape and transparency of the stencil target 40.

The image generating unit 106 then determines the white light display 300 on the basis of the detection result of the positional relationship between the projection apparatus 20 and the drawing destination 30. Further, the image generating unit 106 determines the display 320 of the shape of the stencil target 40 having transparency on the basis of the detection result of the positional relationship among the projection apparatus 20, the drawing destination 30 and the stencil target 40 and the detection result of the shape and the transparency of the stencil target 40. The image generating unit 106 then generates a drawn image including the determined white light display 300 and the display 320 of the shape of the stencil target 40 having transparency. Subsequently, as illustrated in (B) in FIG. 11, the projection control unit 108 causes the projection apparatus 20 to project the generated drawn image onto the drawing destination 30.

2-2-4. Display of Combination of Pictures Using Time Difference

Figure 12:
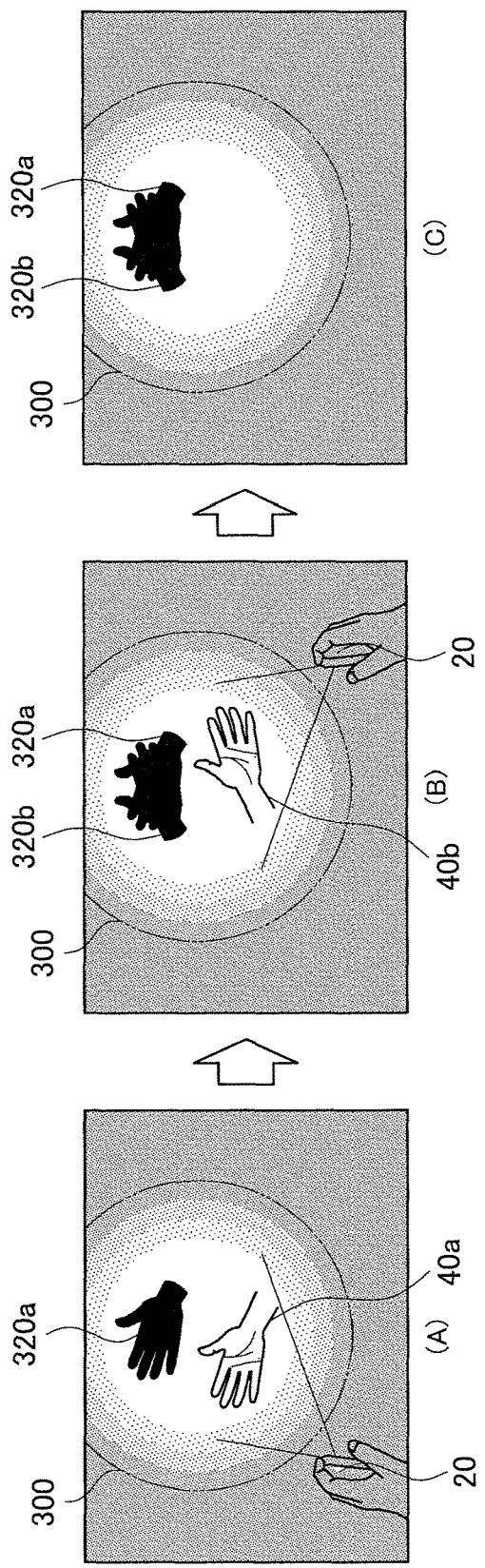
FIGS. 12(A), 12(B), and 12(C) are explanatory diagrams illustrating a projection example of display of combination of pictures of shape of the stencil target 40 using a time difference according to an embodiment of the present disclosure.

A projection example of display 320 of combination of pictures of the shape of the stencil target 40 using a time difference will be described next with reference to FIG. 12. For example, as illustrated in (A) in FIG. 12, first the stencil target detecting unit 222 of the projection apparatus 20 detects the right hand 40*a* which is a stencil target. The image generating unit 106 then determines display 320*a* of shadow of the right hand 40*a* on the basis of the detection result of the positional relationship among the projection apparatus 20, the drawing destination 30 and the right hand 40*a* and the detection result of the shape of the right hand 40*a* and generates a drawn image including the determined display 320*a* of the shadow of the right hand 40*a*. The projection control unit 108 then causes the projection apparatus 20 to project the generated drawn image onto the drawing destination 30.

Subsequently, as illustrated in (B) in FIG. 12, in the case where the right hand 40*a* is moved outside a detection range of the stencil target 40 and the left hand 40*b* which is another stencil target is disposed within the detection range of the stencil target 40, the stencil target detecting unit 222 newly detects the left hand 40*b*. The image generating unit 106 then determines display 320*b* of the shadow of the left hand 40*b* on the basis of the detection result of the positional relationship among the projection apparatus 20, the drawing destination 30 and the left hand 40*b* and the detection result of shape of the left hand 40*b*. The image generating unit 106 then additionally disposes the determined display 320*b* of the shadow of the left hand 40*b* in the generated drawn image.

Subsequently, the projection control unit 108 causes the projection apparatus 20 to project the generated drawn image onto the drawing destination 30. By this means, as illustrated in (C) in FIG. 12, both the display 320*a* of the shadow of the right hand 40*a* and the display 320*b* of the shadow of the left hand 40*b* are projected onto the drawing destination 30.

2-2-5. Display of Synthesized Animation

Figure 13:
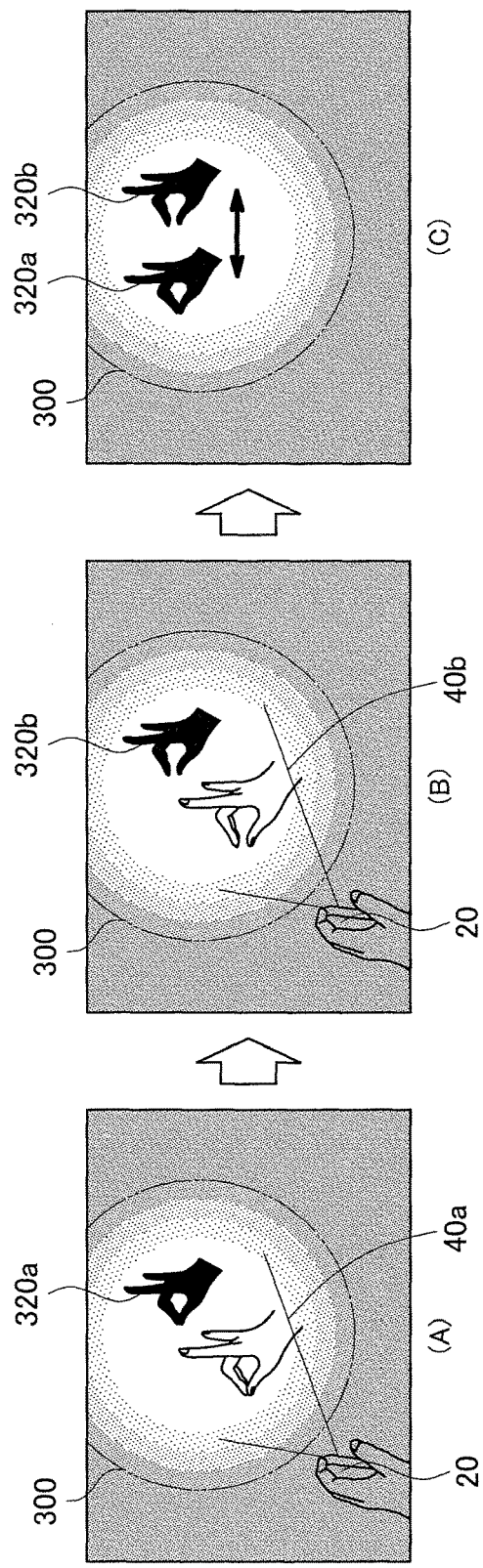
FIGS. 13(A), 13(B), and 13(C) are explanatory diagrams illustrating a projection example of synthesized animation based on change of the shape of the stencil target 40 according to an embodiment of the present disclosure

A projection example of synthesized animation based on detection of change of the shape of the stencil target 40 will be described next with reference to FIG. 13. For example, as illustrated in (A) in FIG. 13, first, the stencil target detecting unit 222 of the projection apparatus 20 detects first pose 40*a* of the right hand (which is the stencil target 40). The image generating unit 106 then determines display 320*a* of shadow of the first pose 40*a* of the right hand on the basis of the detection result of the positional relationship among the projection apparatus 20, the drawing destination 30 and the first pose 40*a* of the right hand and the detection result of the shape of the first pose 40*a* of the right hand. The image generating unit 106 then generates a first drawn image including the determined display 320*a* of the shadow of the first pose 40*a* of the right hand.

Subsequently, as illustrated in (B) in FIG. 13, in the case where it is detected that the pose of the right hand changes from the first pose 40*a* to second pose 40*b*, the stencil target detecting unit 222 detects the second pose 40*b* of the right hand. The image generating unit 106 then determines display 320*b* of shadow of the second pose 40*b* of the right hand on the basis of the detection result of the positional relationship among the projection apparatus 20, the drawing destination 30 and the second pose 40*b* of the right hand and the detection result of the shape of the second pose 40*b* of the right hand. The image generating unit 106 then generates a second drawn image including the determined display 320*b* of the shadow of the second pose 40*b* of the right hand. Subsequently, as illustrated in (C) in FIG. 13, the projection control unit 108 causes the projection apparatus 20 to project animation in which the generated first drawn image and the second drawn image are sequentially displayed onto the drawing destination 30.

Note that this animation display may be animation display in which the display 320*a* of the shadow of the first pose of the right hand and the display 320*b* of the shadow of the second pose of the right hand are sequentially displayed, or animation in which display continuously changes from the display 320*a* of the shadow of the first pose of the right hand to the display 320*b* of the shadow of the second pose of the right hand. Note that, in the latter case, for example, display of shadow obtained by linearly interpolating the display 320*a* of the shadow of the first pose and the display 320*b* of the shadow of the second pose, for example, on the basis of elapsed time may be projected between a projection timing of the display 320*a* of the shadow of the first pose and a projection timing of the display 320*b* of the shadow of the second pose.

2-2-6. Filled Area Display by Movement of Stencil Target

Figure 14:
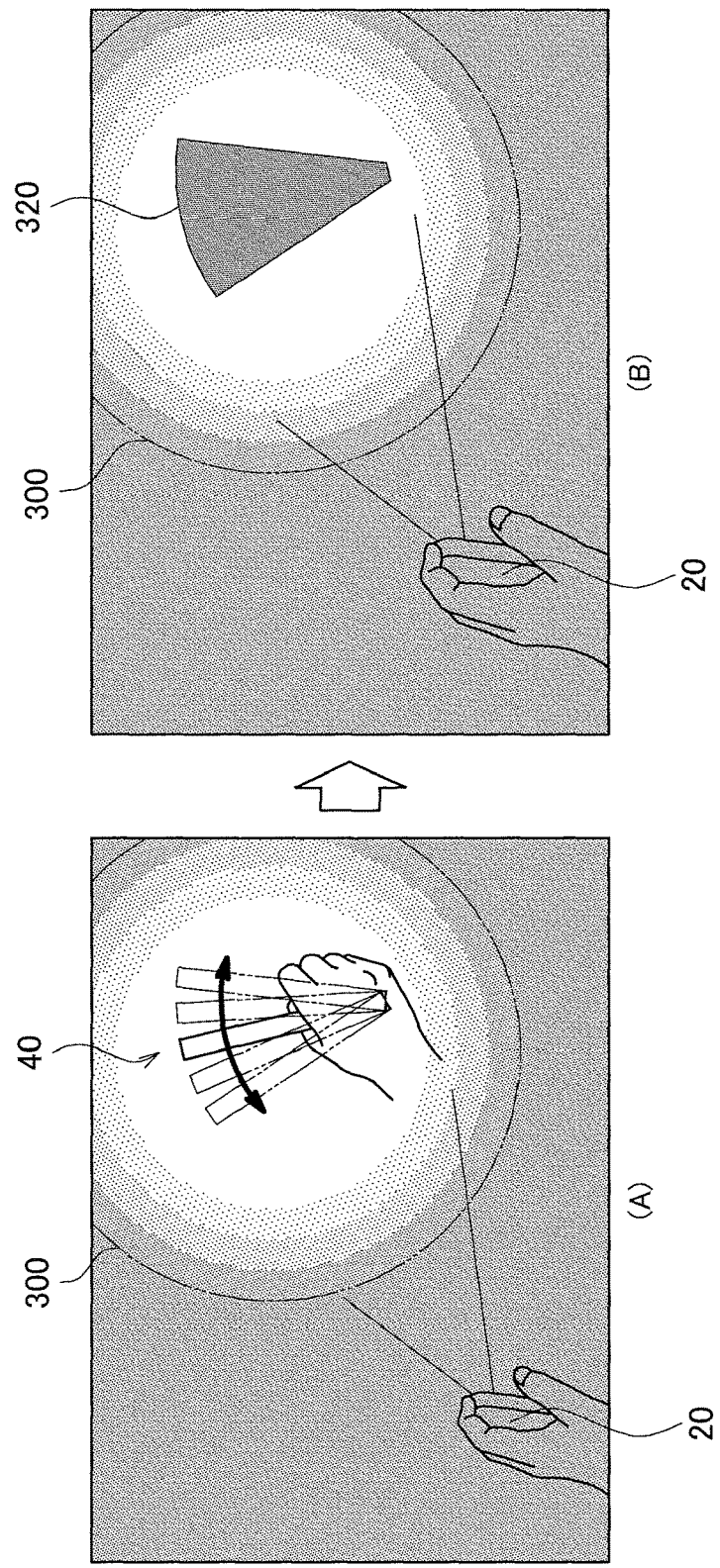
FIGS. 14(A) and 14(B) are explanatory diagrams illustrating a projection example of filled area display based on movement of the stencil target 40 according to an embodiment of the present disclosure.

A projection example of filled area display based on detection of movement of the stencil target 40 will be described next with reference to FIG. 14. For example; as illustrated in (A) in FIG. 14, it is assumed that the user reciprocates the stencil target 40 which is an elongated rectangle in a direction parallel to the drawing destination 30. In this case, first, the stencil target detecting unit 222 of the projection apparatus 20 detects shape and a moving range of the stencil target 40. The image generating unit 106 then determines filled area display 320 including shadow of the whole moving range of the stencil target 40 on the basis of the detection result of the positional relationship between the projection apparatus 20 and the drawing destination 30 and the detection result of the shape and the moving range of the stencil target 40 and generates a drawn image including the determined filled area display 320.

Subsequently, as illustrated in (B) in FIG. 14, the projection control unit 108 causes the projection apparatus 20 to project the generated drawn image onto the drawing destination 30. Note that, in the example illustrated in FIG. 14, display color of the filled area display 320 may be determined so as to gradationally change from a portion where a moving amount is small (for example, a portion grasped with the right hand by the user, illustrated in FIG. 14) among the stencil target 40 toward a portion where the moving amount is large, or one color may be determined as display color of the whole of the filled area display 320.

2-2-7. Simultaneous Duplication Display by a Plurality of Projection Apparatuses 20

Figure 15:
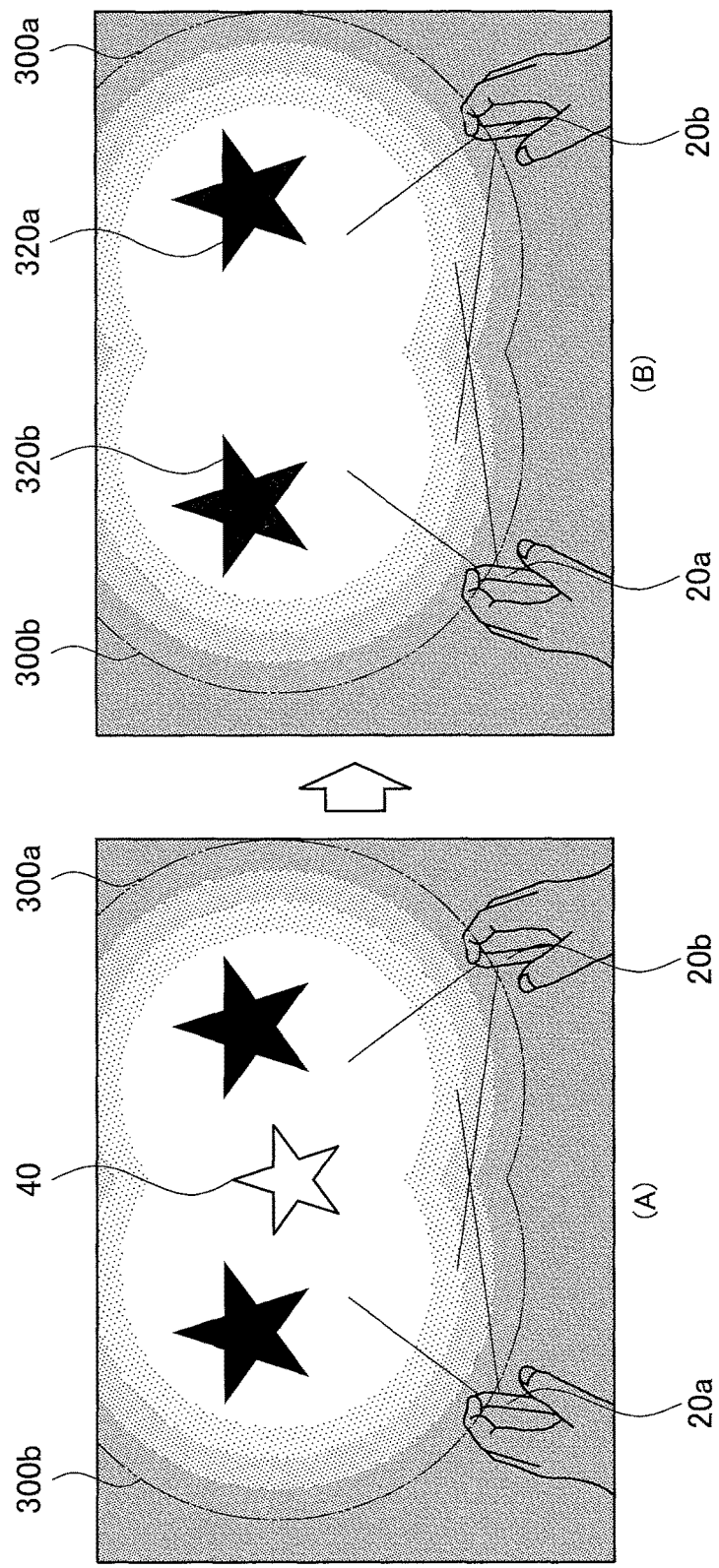
FIGS. 15(A) and 15(B) are explanatory diagrams illustrating a projection example of duplication display of shadow of the stencil target 40 by a plurality of projection apparatuses 20 according to an embodiment of the present disclosure.

A projection example of duplication display by the stencil target 40 being detected by a plurality of projection apparatuses 20 at the same time will be described next with reference to FIG. 15. For example, as illustrated in (A) in FIG. 15, first, the respective stencil target detecting units 222 of the two projection apparatuses 20 detect the stencil target 40 at the same time. The image generating unit 106 then determines the white light display 300a on the basis of the detection result of the positional relationship between the projection apparatus 20a and the drawing destination 30. The image generating unit 106 then determines the display 320a of the shadow of the stencil target 40 on the basis of the detection result of the positional relationship among the projection apparatus 20a, the drawing destination 30 and the stencil target 40, and the detection result of the shape of the stencil target 40 (by the projection apparatus 20a). The image generating unit 106 then generates a first drawn image including the determined display 320a of the shadow of the stencil target 40 and white light display 300a.

Further, the image generating unit 106 determines white light display 300b on the basis of the detection result of the positional relationship between the projection apparatus 20b and the drawing destination 30. The image generating unit 106 then determines display 320b of shadow of the stencil target 40 on the basis of the detection result of the positional relationship among the projection apparatus 20b, the drawing destination 30 and the stencil target 40 and the detection result of the shape of the stencil target 40 (by the projection apparatus 20b). The image generating unit 106 then generates a second drawn image including the determined display 320b of the shadow of the stencil target 40 and white light display 300b.

Subsequently, as illustrated in (B) in FIG. 15, the projection control unit 108 causes the projection apparatus 20a to project the generated first drawn image onto the drawing destination 30 and causes the projection apparatus 20b to project the generated second drawn image onto the drawing destination 30.

2-3. Operation

The application examples by the present embodiment have been described above. Operation of the present embodiment will be described next from "2-3-1. Operation upon setting of manual switching of mode" to "2-3-2. Operation upon setting of automatic switching of mode". Note that, basically, it is assumed that setting of manual switching of a mode or setting of automatic switching of a mode, which will be described below is set in advance at the server 10.

2-3-1. Operation Upon Setting of Manual Switching of Model

Figure 16:
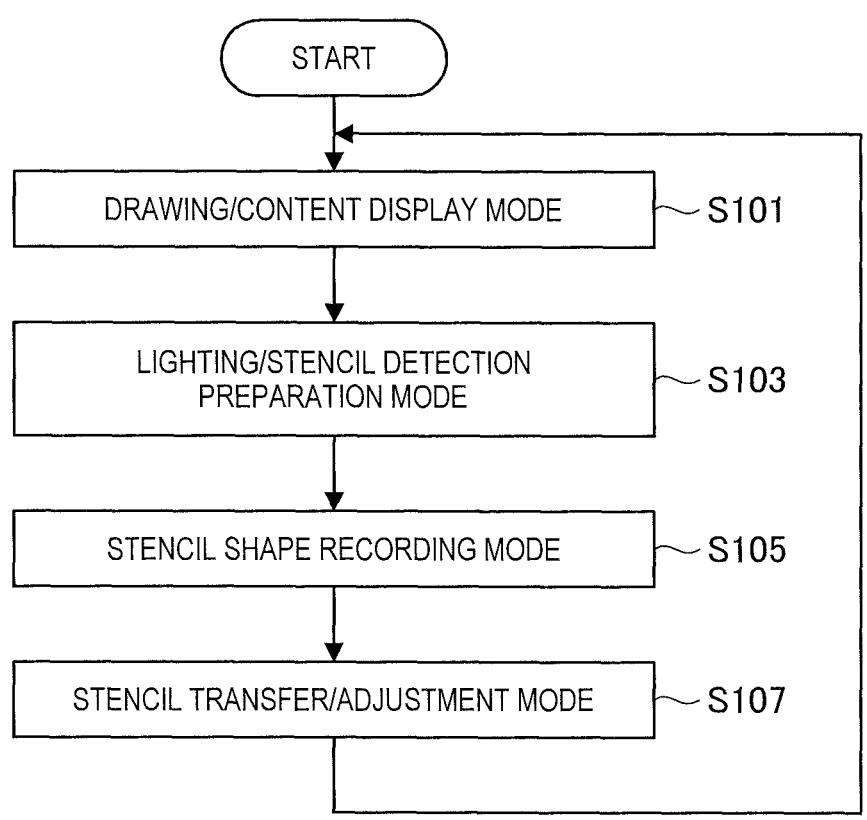
FIG. 16 is a flowchart illustrating operation upon setting of manual switching of a mode according to an embodiment of the present disclosure.

FIG. 16 is a flowchart illustrating operation upon setting of manual switching of a mode according to the present embodiment. As illustrated in FIG. 16, the control unit 100 of the server 10 first starts a drawing/content mode on the basis of, for example, a detection result of predetermined input manipulation, or the like, with respect to the projection apparatus 20 (S101). In this drawing/content mode, first, the image generating unit 106 generates a drawn image on the basis of the detection result of the positional relationship between the projection apparatus 20 and the drawing destination 30. The projection control unit 108 then causes the projection apparatus 20 to project the generated drawn image onto the drawing destination 30.

Subsequently, for example, in the case where some kind of manipulation of switching a mode by the user is detected, or in the case where intervention of the stencil target 40 is detected by the stencil target detecting unit 222, the control unit 100 causes the state to transition to a lighting/stencil detection preparation mode (S103). In this lighting/stencil detection preparation mode, the projection control unit 108 causes the projection apparatus 20 to project white light all over onto the drawing destination 30 like spot light. By this means, in the case where the stencil target 40 is located between the projection apparatus 20 and the drawing destination 30, shadow of the real stencil target 40 is projected onto the drawing destination 30.

Subsequently, in the case where some kind of manipulation of switching a mode by the user is detected, the control unit 100 causes the state to transition to a stencil shape recording mode (S105). In this stencil shape recording mode, first, the stencil target detecting unit 222 of the projection apparatus 20 detects the shape, or the like, of the stencil target 40 and transmits the detection result to the server 10. The detection result acquiring unit 102 of the server 10 then records the detection result of the shape of the stencil target 40 in the storage unit 122.

Subsequently, in the case where some kind of manipulation of switching a mode is detected, the control unit 100 causes the state to transition to a stencil transfer/adjustment mode (S107). In this stencil transfer/adjustment mode, the projection control unit 108 of the server 10 causes the projection apparatus 20 to project the above-described guide display onto the drawing destination 30. Then, the image generating unit 106 disposes the display of the shape of the stencil target 40 at a position where the display of the shape of the stencil target 40 is to be disposed, designated by the user on the basis of detection of predetermined manipulation for determining the position where the display of the shape of the stencil target 40 is to be disposed. By this means, the user can arbitrarily adjust the position where the display of the shape of the stencil target 40 is to be disposed in the drawn image to be generated.

Subsequently, in the case where some kind of manipulation of switching a mode is detected, the control unit 100 performs operation of S101 again. Note that, at this time, the image generating unit 106 disposes the display of the shape of the stencil target 40 at the position where the display of the shape of the stencil target 40 is to be disposed, determined in S107 in a new drawn image to be generated.

2-3-2. Operation Upon Automatic Switching of Mode

Figure 17:
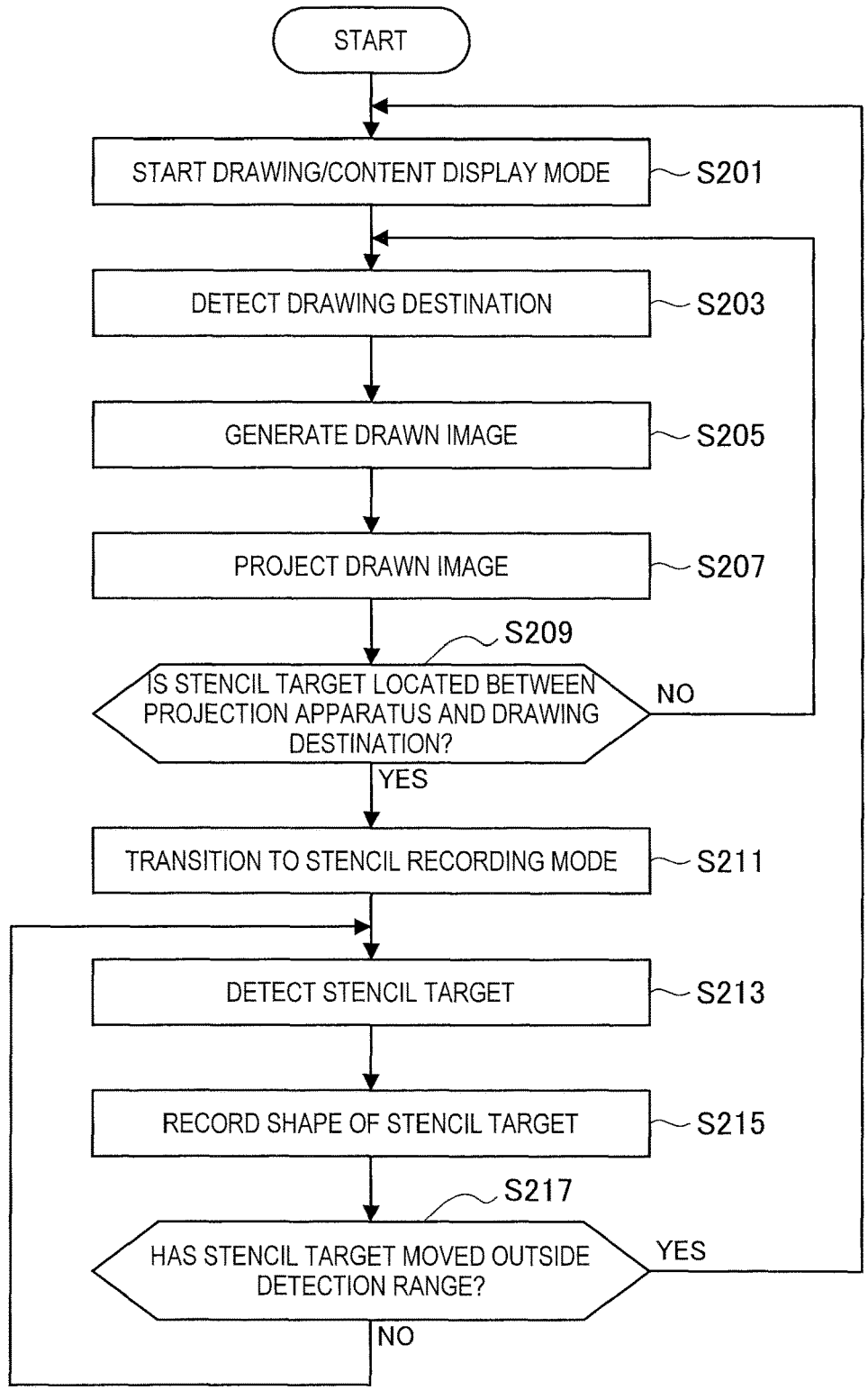
FIG. 17 is a flowchart illustrating operation upon setting of automatic switching of a mode according to an embodiment of the present disclosure.

An operation example of operation upon setting of automatic switching of a mode according to the present embodiment will be described next with reference to FIG. 17. As illustrated in FIG. 17, first, the control unit 100 of the server 10 starts the drawing/content mode on the basis of, for example, predetermined input manipulation with respect to the projection apparatus 20 (S201).

Subsequently, the drawing destination detecting unit 224 of the projection apparatus 20 detects a position, attitude, shape, or the like, of the drawing destination 30. The communication unit 228 then transmits the detected information to the server 10 in accordance with control by the control unit 200 (S203).

Subsequently, the image generating unit 106 of the server 10 generates a drawn image on the basis of, for example, the detection result, or the like, of the positional relationship between the projection apparatus 20 and the drawing destination 30 (S205). Note that, at this time, in the case where processing of S217 which will be described later has already been executed, the image generating unit 106 generates a drawn image so as to include display indicating the shape of the stencil target 40 recorded in the storage unit 122.

Subsequently, the projection control unit 108 causes the projection apparatus 20 to project the generated drawn image onto the drawing destination 30 (S207).

Subsequently, the control unit 100 determines whether or not the stencil target 40 is located between the projection apparatus 20 and the drawing destination 30 on the basis of the detected information received from the projection apparatus 20 (S209). In the case where the stencil target 40 is not detected (S209: No), the control unit 100 performs operation of S203 again.

Meanwhile, in the case where the stencil target 40 is detected (S209: Yes), the control unit 100 causes the state to transition to the stencil recording mode (S211).

Subsequently, the stencil target detecting unit 222 detects a position and shape of the stencil target 40. The communication unit 228 then transmits the information detected by the stencil target detecting unit 222 to the server 10 in accordance with control by the control unit 200 (S213).

Subsequently, the detection result acquiring unit 102 of the server 10 records the detected shape information, or the like, of the stencil target 40 in the storage unit 122 on the basis of the received information (S215).

Subsequently, the control unit 100 determines whether or not the stencil target 40 has moved outside a detection range on the basis of the detected information received from the projection apparatus 20 (S217). In the case where the stencil target 40 is located within the detection range (S217: No), the control unit 100) performs operation of S213 again.

Meanwhile, in the case where the stencil target 40 has moved outside the detection range (S217: Yes), the control unit 100 performs the operation of S201 again.

2-4. Effects

2-4-1. Effect 1

As described above, the server 10 according to the present embodiment generates a drawn image on the basis of the detection result of the positional relationship among the projection apparatus 20, the drawing destination 30 and the stencil target 40, and, then, causes the projection apparatus 20 to project the generated drawn image onto the drawing destination 30. For example, the server 10 determines a display aspect of the display of the shadow of the stencil target 40 on the basis of the detection result of the positional relationship among the projection apparatus 20, the drawing destination 30 and the stencil target 40, and the detection result of the shape of the stencil target 40, and, then, generates a drawn image including the determined display of the shadow of the stencil target 40.

Therefore, the server 10 can cause a drawn image adapted to the positional relationship among the projection apparatus 20, the drawing destination 30 and the stencil target 40 to be projected onto the drawing destination 30. For example, if the stencil target 40 is located between the projection apparatus 20 and the drawing destination 30, the server 10 can cause display indicating shadow projected onto the drawing destination 30 by light emitted from the projection apparatus 20 being blocked by the stencil target 40, to be projected onto the drawing destination 30.

2-4-2. Effect 2

Further, the server 10 determines a display aspect of display of ejected ink on the basis of the detection result of manipulation with respect to the projection apparatus 20 and the pointing position, the detection result of attribute of the drawing destination 30, the detection result of the positional relationship between the projection apparatus 20 and the drawing destination 30, or the like, and, then, generates a drawn image including the determined display of ink. Therefore, it becomes possible to electronically realize drawing using an actual spray can or air brush on the basis of the detection result of manipulation with respect to the projection apparatus 20. Further, the user can perform drawing as if the user used an actual spray can or air brush. Still further, by the user recording the drawn information, the user can cause the information drawn in the past to be projected onto the drawing destination 30 any time or to be displayed at a display apparatus such as, for example, an LCD and an OLED.

Further, for example, by a plurality of users respectively using projection apparatuses 20, the plurality of users can perform drawing onto the drawing destination 30 at the same time. Still further, the user can perform additional drawing onto an image drawn in the past any time. Further, the plurality of users can also browse the drawn video together. Therefore, it is possible to support communication by the plurality of users through drawing activity.

Further, according to the present embodiment, it is possible to perform virtual drawing onto the drawing destination 30 such as, for example, water, onto which it is difficult to perform drawing using a spray can or air brush, and it is possible to perform virtual drawing onto the drawing destination 30 such as, for example, a wall of a building, onto which drawing is prohibited. Therefore, it is possible to support, for example, a wide variety of drawing activities by designers.

3. Hardware Configuration

Figure 18:
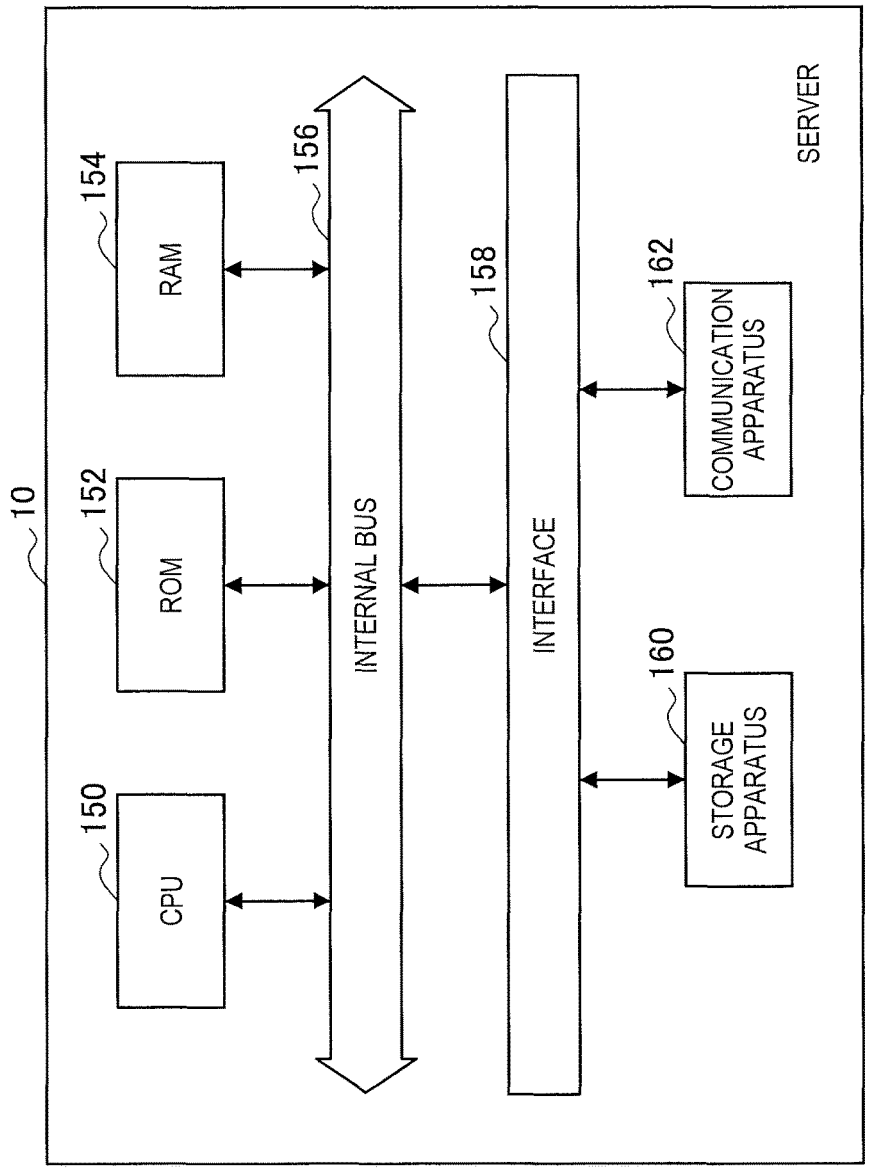
FIG. 18 is an explanatory diagram illustrating a hardware configuration of the server 10 according to an embodiment of the present disclosure.

A hardware configuration of the server 10 according to the present embodiment will be described next with reference to FIG. 18. As illustrated in FIG. 18, the server 10 includes a CPU 150, a ROM 152, a RAM 154, an internal bus 156, an interface 158, a storage apparatus 160 and a communication apparatus 162.

The CPU 150, which functions as an arithmetic processing unit and a control apparatus, controls the whole operation within the server 10 in accordance with various kinds of programs. Further, the CPU 150 implements functions of the control unit 100 in the server 10. Note that the CPU 150 is configured with a processor such as a microprocessor.

The ROM 152 stores control data, or the like, such as a program and an operation parameter to be used by the CPU 150.

The RAM 154, for example, temporarily stores a program, or the like, to be executed by the CPU 150.

The internal bus 156 is configured with a CPU bus, or the like. This internal bus 156 interconnects the CPU 150, the ROM 152 and the RAM 154

The interface 158 connects the storage apparatus 160 and the communication apparatus 162 to the internal bus 156. For example, the storage apparatus 160 exchanges data with the CPU 150 via this interface 158 and the internal bus 156.

The storage apparatus 160 is an apparatus for data storage, which functions as the storage unit 122. The storage apparatus 160 includes, for example, a storage medium, a recording apparatus which records data in the storage medium, a readout apparatus which reads out data from the storage medium, a deleting apparatus which deletes data recorded in the storage medium, or the like.

The communication apparatus 162 is a communication interface configured with a communication device, or the like, for being connected to a communication network such as, for example, a public network and the Internet. Further, the communication apparatus 162 may be a communication apparatus supporting a wireless LAN, a communication apparatus supporting long term evolution (LTE) or a wired communication apparatus which performs communication in a wired manner. This communication apparatus 162 functions as the communication unit 120.

4. Modified Examples

The preferred embodiment of the present disclosure has been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the configuration of the image processing system according to the present embodiment is not limited to the above-described configuration. For example, any one or more of the above-described stencil target detecting unit 222, the drawing destination detecting unit 224 and the drawing input unit 226 may be included in another apparatus. As an example, in the case where the projection apparatus 20 is configured as a fixed apparatus including the projection unit 220, a mobile apparatus including the stencil target detecting unit 222, the drawing destination detecting unit 224 and the drawing input unit 226 may be separately provided.

Further, while, in the above-described embodiment, an example has been described where the image processing apparatus in the present disclosure is the server 10, the present disclosure is not limited to such an example. For example, the image processing apparatus may be a personal computer (PC), a smartphone, a tablet terminal, game machine, or the like.

Further, in the case where the projection apparatus 20 has all the components included in the above-described control unit 100, the image processing apparatus in the present disclosure may be the projection apparatus 20. Then, in a case of this modified example, the server 10 does not have to be provided.

Further, according to the above-described embodiment, it is also possible to provide a computer program for causing hardware such as the CPU 150, the ROM 152 and the RAM 154 to fulfill functions equivalent to each component of the server 10 according to the above-described embodiment. Further, a recording medium in which the computer program is recorded is also provided.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An image processing apparatus including:

an image generating unit configured to generate a drawn image to be drawn on a drawing destination on a basis of a position of an operation unit, in which the image generating unit generates the drawn image on a basis of detected information of a stencil target located between the operation unit and the drawing destination.

(2)

The image processing apparatus according to (1), in which the image generating unit generates the drawn image further on a basis of detected information of the drawing destination.

(3)

The image processing apparatus according to (2), in which the image generating unit generates the drawn image on a basis of a detection result of positional relationship among the operation unit, the drawing destination and the stencil target.

(4)

The image processing apparatus according to (3).

in which the detected information of the stencil target includes detected information of shape of the stencil target.

(5)

The image processing apparatus according to (4), in which the detected information of the drawing destination includes detected information of a position and attitude of the drawing destination, and the detected information of the stencil target further includes detected information of a position and attitude of the stencil target.

(6)

The image processing apparatus according to (4) or (5), in which the image generating unit generates the drawn image further on a basis of detected information of attitude of the operation unit.

(7)

The image processing apparatus according to any one of (4) to (6), in which the image generating unit disposes display indicating the shape of the stencil target within the drawn image on a basis of the detected information of the shape of the stencil target.

(8)

The image processing apparatus according to (7), in which the display indicating the shape of the stencil target is display indicating shadow of the stencil target on the drawing destination.

(9)

The image processing apparatus according to (7) or (8), in which the operation unit includes a projection unit, and the image processing apparatus further includes a projection control unit configured to cause the projection unit to project the drawn image generated by the image generating unit onto the drawing destination.

(10)

The image processing apparatus according to (9), in which the projection control unit further causes the projection unit to project guide display for allowing a user to designate a projection position of the display indicating the shape of the stencil target onto the drawing destination, and the image generating unit determines a position where the display indicating the shape of the stencil target is to be disposed in the drawn image on a basis of detection of manipulation by a user for moving a projection position of the projected guide display.

(11)

The image processing apparatus according to (9) or (10), further including:

a drawing position recording unit configured to record drawing positions in a storage unit in order of detection with detection results of pointing positions pointed by the projection unit on the drawing destination set as the drawing positions by a user, in which the image generating unit generates the drawn image so as to further include display indicating a plurality of the drawing positions recorded in the storage unit.

(12)

The image processing apparatus according to (11), in which the display indicating the drawing positions is display indicating a virtual object ejected to the drawing positions by the projection unit.

(13)

The image processing apparatus according to (12), in which the image generating unit determines a size or shape of the display indicating the virtual object ejected to the drawing positions on a basis of a detection result of positional relationship between the operation unit and the drawing destination.

(14)

The image processing apparatus according to any one of (11) to (13), in which the drawing position recording unit records a pointing position detected upon predetermined drawing manipulation by the user with respect to the operation unit in the storage unit as the drawing position.

(15)

The image processing apparatus according to (14).

in which the drawing position recording unit records manipulation contents by the user with respect to the operation unit upon detection of the drawing position and the drawing position in the storage unit in association with each other, and the image generating unit determines a display aspect of display indicating the drawing position on a basis of the manipulation contents by the user recorded in the storage unit in association with the drawing position.

(16)

The image processing apparatus according to any one of (11) to (15), in which the drawn image further includes projection region display indicating a projection range on the drawing destination by the projection unit.

(17)

The image processing apparatus according to (16), in which the display indicating the plurality of drawing positions is display indicating a plurality of drawing positions located within a range of the projection region display among the plurality of drawing positions recorded in the storage unit.

(18)

The image processing apparatus according to (16) or (17), in which the image generating unit determines a size or shape of the projection region display on a basis of a detection result of positional relationship between the operation unit and the drawing destination.

(19)

An image processing method including:

generating, by a processor, a drawn image to be drawn on a drawing destination on a basis of a position of an operation unit and detected information of a stencil target located between the operation unit and the drawing destination.

(20)

A program causing a computer to function as:

an image generating unit configured to generate a drawn image to be drawn on a drawing destination on a basis of a position of an operation unit, in which the image generating unit generates the drawn image on a basis of detected information of a stencil target located between the operation unit and the drawing destination.

REFERENCE SIGNS LIST 10 server
20 projection apparatus
30 drawing destination
40 stencil target
42 communication network
100, 200 control unit
102 detection result acquiring unit
104 drawing position recording unit
106 image generating unit
108 projection control unit
120, 228 communication unit
122 storage unit
220 projection unit
222 stencil target detecting unit
224 drawing destination detecting unit
226 drawing input unit

The invention claimed is:

1. An image processing apparatus comprising:
an image generating unit configured to generate a drawn image to be drawn on a drawing destination on a basis of a position of an operation unit,
wherein the image generating unit generates the drawn image on a basis of detected information of a stencil target including a position of the stencil target that is located between the operation unit and the drawing destination,
wherein the image generating unit is implemented via at least one processor.

2. The image processing apparatus according to claim 1, wherein the image generating unit generates the drawn image further on a basis of detected information of the drawing destination.

3. The image processing apparatus according to claim 2, wherein the image generating unit generates the drawn image on a basis of a detection result of positional relationship among the operation unit, the drawing destination and the stencil target.

4. The image processing apparatus according to claim 3, wherein the detected information of the stencil target includes detected information of shape of the stencil target.

5. The image processing apparatus according to claim 4, wherein the detected information of the drawing destination includes detected information of a position and attitude of the drawing destination, and
wherein the detected information of the stencil target further includes detected information of a position and attitude of the stencil target.

6. The image processing apparatus according to claim 4, wherein the image generating unit generates the drawn image further on a basis of detected information of attitude of the operation unit.

7. The image processing apparatus according to claim 4, wherein the image generating unit disposes display indicating the shape of the stencil target within the drawn image on a basis of the detected information of the shape of the stencil target.

8. The image processing apparatus according to claim 7, wherein the display indicating the shape of the stencil target is display indicating shadow of the stencil target on the drawing destination.

9. The image processing apparatus according to claim 7, wherein the operation unit includes a projection unit, and
wherein the image processing apparatus further includes a projection control unit configured to cause the projection unit to project the drawn image generated by the image generating unit onto the drawing destination.

10. The image processing apparatus according to claim 9, wherein the projection control unit further causes the projection unit to project guide display for allowing a user to designate a projection position of the display indicating the shape of the stencil target onto the drawing destination, and
wherein the image generating unit determines a position where the display indicating the shape of the stencil target is to be disposed in the drawn image on a basis of detection of manipulation by a user for moving a projection position of the projected guide display.

11. The image processing apparatus according to claim 9, further comprising:
a drawing position recording unit configured to record drawing positions in a storage unit in order of detection with detection results of pointing positions pointed by the projection unit on the drawing destination set as the drawing positions by a user,
wherein the image generating unit generates the drawn image so as to further include display indicating a plurality of the drawing positions recorded in the storage unit, and
wherein the drawing position recording unit is implemented via at least one processor.

12. The image processing apparatus according to claim 11, wherein the display indicating the drawing positions is display indicating a virtual object ejected to the drawing positions by the projection unit.

13. The image processing apparatus according to claim 12, wherein the image generating unit determines a size or shape of the display indicating the virtual object ejected to the drawing positions on a basis of a detection result of positional relationship between the operation unit and the drawing destination.

14. The image processing apparatus according to claim 11, wherein the drawing position recording unit records a pointing position detected upon predetermined drawing manipulation by the user with respect to the operation unit in the storage unit as the drawing position.

15. The image processing apparatus according to claim 14, wherein the drawing position recording unit records manipulation contents by the user with respect to the operation unit upon detection of the drawing position and the drawing position in the storage unit in association with each other, and
wherein the image generating unit determines a display aspect of display indicating the drawing position on a basis of the manipulation contents by the user recorded in the storage unit in association with the drawing position.

16. The image processing apparatus according to claim 11, wherein the drawn image further includes projection region display indicating a projection range on the drawing destination by the projection unit.

17. The image processing apparatus according to claim 16, wherein the display indicating the plurality of drawing positions is display indicating a plurality of drawing positions located within a range of the projection region display among the plurality of drawing positions recorded in the storage unit.

18. The image processing apparatus according to claim 16, wherein the image generating unit determines a size or shape of the projection region display on a basis of a detection result of positional relationship between the operation unit and the drawing destination.

19. An image processing method comprising:
generating, by a processor, a drawn image to be drawn on a drawing destination on a basis of a position of an operation unit and detected information of a stencil target including a position of the stencil target that is located between the operation unit and the drawing destination.

20. A non-transitory computer-readable medium having embodied thereon a program, which when executed by a computer causes the computer to execute a method, the method comprising:
generating a drawn image to be drawn on a drawing destination on a basis of a position of an operation unit,
wherein the drawn image is generated on a basis of detected information of a stencil target including a position of the stencil target that is located between the operation unit and the drawing destination.

* * * * *